United States Patent
Baek et al.

(10) Patent No.: US 12,318,041 B2
(45) Date of Patent: Jun. 3, 2025

(54) BLENDER

(71) Applicant: LG ELECTRONICS INC., Seoul (KR)

(72) Inventors: In Woo Baek, Seoul (KR); Jun Ho Seok, Seoul (KR); Yang Ho Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 697 days.

(21) Appl. No.: 17/616,273

(22) PCT Filed: Sep. 4, 2020

(86) PCT No.: PCT/KR2020/011991
§ 371 (c)(1),
(2) Date: Dec. 3, 2021

(87) PCT Pub. No.: WO2021/075722
PCT Pub. Date: Apr. 22, 2021

(65) Prior Publication Data
US 2022/0248907 A1  Aug. 11, 2022

(30) Foreign Application Priority Data
Oct. 14, 2019  (KR) ........................ 10-2019-0127175

(51) Int. Cl.
*A47J 43/00* (2006.01)
*A47J 43/046* (2006.01)
*A47J 43/07* (2006.01)

(52) U.S. Cl.
CPC ........ *A47J 43/046* (2013.01); *A47J 43/0722* (2013.01); *A47J 43/0772* (2013.01)

(58) Field of Classification Search
CPC .. A47J 43/046; A47J 43/0722; A47J 43/0772; A47J 43/07; A47J 43/0711
See application file for complete search history.

(56) References Cited

U.S. PATENT DOCUMENTS

2005/0167537 A1* 8/2005 Chen ...................... B02C 18/18
                                                         241/292.1
2017/0208999 A1  7/2017 Lee
2018/0279833 A1* 10/2018 Lin ........................ A47J 43/042

FOREIGN PATENT DOCUMENTS

| CN | 201755125 U | 3/2011 |
| JP | P200051103 A | 2/2000 |
| JP | P201833661 A | 3/2018 |

* cited by examiner

*Primary Examiner* — Anshu Bhatia
(74) *Attorney, Agent, or Firm* — Bryan Cave Leighton Paisner LLP

(57) ABSTRACT

A blender includes a blade in which dimple is formed. The blender includes a container body configured to receive food, a main body provided under the container body and supporting the container body, a container lid mounted removably to an upper surface of the container body and configured to open and close an upper part of the container body, and a blade assembly configured to crush food contained in the container body by a blade, where a dimple is formed in the blade. Accordingly, the crushing efficiency of food is improved and noise is reduced.

19 Claims, 20 Drawing Sheets

BLENDER

This application is the National Stage filing under 35 U.S.C. 371 of International Application No. PCT/KR2020/011991, filed on Sep. 4, 2020, which claims the benefit of priority of Korean Patent Application No. 10-2019-0127175, filed on Oct. 14, 2019, all of which are incorporated by reference in their entirety herein.

TECHNICAL FIELD

The present disclosure relates generally to a blender. More particularly, the present disclosure relates to a blender in which a dimple is formed in a blade.

BACKGROUND

Generally, a blender is referred to as a mixer or crusher, and is mainly used for crushing or chopping food contained in a container body by rotating blades rotated by the motor.

In a normal blender, a main body having a motor operated by electricity is located at the lower side of the blender, and the container body receiving food is seated on the upper side of such a main body. Blades crushing or chopping food are provided inside the container body, and are rotated by the rotational force of the motor.

Accordingly, when a user drives the motor by using a manipulation button or a knob of the main body after putting food in the container body, the blades receiving the rotational force generated by the motor crush or chop food contained inside the container body.

Such a blender has been recently developed in accordance with a user's desire to facilitate the intake of food, such as, office workers in to their busy daily life. That is, a small hand blender has been developed, and a blender has been developed that allows food to be crushed in larger capacity or at high speed.

However, the structure of such a conventional container body or blade has a problem in that it takes a long time to crush food, and food is not properly crushed or mixed.

For example, a cutter for a mixer is disclosed in Korean Patent No. 10-1219753. In such a prior art, two cutters (blades) are formed symmetrically to each other in a side-to-side direction, and are installed horizontally.

Accordingly, the cutters (blades) rotate while maintaining a state parallel to the bottom surface of the container body, and thus the crushing of food is concentrated only on the food located at the lower part of the container body, so the crushing and mixing of entire food are not properly performed, and it takes a long time to crush food.

In addition, in Korean Patent No. 10-1384979, a blade improved more than the above-mentioned blade is disclosed. That is, four blades are provided in front-to-rear and side-to-side directions, and the blades are installed even in downward directions in addition to the horizontal directions. However, in such a structure, each of the blades is configured to have only a flat surface, so the food may stick to the upper surface of the blade, thereby causing excessive load on a motor or decreasing crushing efficiency of food.

To solve the problems of such a prior blender, in US Patent Application Publication No. 2016/0066748A1, the blade of a blender is bent vertically, and to reinforce the bent blade, a gusset is formed.

However, even in such a prior art, the release of friction problems for improving the crushing ability of the blade and the release of noise problem of the blade are not performed. That is, in the prior art, a part in which the blade crushes food by vertically bending is increased to some degree. However, the blade configured as a flat surface is still used, and thus the contact surface of the food with the surface of the blade is large, so there is still a problem of large frictional force due to viscosity.

In addition, the gusset is formed on the blade, which functions to reinforce the rigidity of the bent portion of the blade, but the gusset protrudes from the surface of the blade, so friction and noise due to the rotation of the blade are not decreased, and rather the protruding gusset causes a vortex which increases the noise or interferes with the food to increase friction.

SUMMARY

Accordingly, the present disclosure has been made to solve the above problems occurring in the prior art, and is intended to propose a blender in which in addition to a main blade, an auxiliary blade is provided.

The present disclosure is intended to propose a blender in which the blade part of the auxiliary blade is located between the blade parts of the main blade.

The present disclosure is intended to propose a blender in which the movement of food contained in a container body is increased by a blade assembly.

The present disclosure is intended to propose a blender in which an area on which the food contained in the container body is in contact with the surface of the blade is decreased to reduce friction therebetween.

The present disclosure is intended to propose a blender in which a dimple decreases the friction of the surface of the blade and prevents a vortex of fluid.

Technical Solution

In order to accomplish the above objectives, according to one aspect of a blender of the present disclosure, dimples may be formed in a blade constituting the blender of the present disclosure. Accordingly, the food may be prevented from sticking to the blade.

In addition, in the blender of the present disclosure, the dimples may be formed at a position near the leading edge of the blade. Accordingly, the vortex of fluid flowing to the upper and lower sides of the blade may be prevented from being generated and the contact resistance of the blade may be reduced.

Furthermore, in the blender of the present disclosure, multiple dimples may be formed side by side to be spaced by the same distances apart from the leading edge of the blade. Accordingly, the flow of fluid may be uniform.

Meanwhile, the blender of the present disclosure may include a container body configured to receive the food, a main body provided under the container body and supporting the container body, a container lid mounted removably to the upper surface of the container body and configured to open and close the upper part of the container body, and a blade assembly configured to crush food contained in the container body by using the blade, wherein the dimples may be formed in the blade.

The dimple may include at least one dimple formed in the upper or lower surface of the blade.

The dimple may include at least one dimple formed in each of the upper and lower surfaces of the blade.

The dimple may be formed in a leading edge part of the blade.

Distance between a leading edge of the blade and the dimple may be shorter than a distance between a rear edge of the blade and the dimple.

The dimple may be configured as a circular recess.

The dimple may be configured as an oval recess.

The dimple may be configured as a groove having a slit shape.

The dimple may include multiple dimples formed to be parallel to the leading edge of the blade.

In addition, the blade assembly may include a main blade having multiple main blade parts formed therein, and an auxiliary blade having an auxiliary blade part located between the multiple main blade parts, wherein the dimple may include at least one dimple formed in a surface of each of the main blade parts and the auxiliary blade part.

The dimple may be formed in the upper surface of the main blade part.

The dimple may be formed in each of the upper and lower surfaces of the main blade part.

The main blade part may be configured to be inclined such that the leading edge part of the main blade part is located at a position higher than a rear edge part thereof.

The dimple may be formed in the leading edge part of the main blade part.

Distance between the leading edge of the main blade part and the dimple may be shorter than distance between the rear end of the main blade part and the dimple.

The multiple dimples may be formed to be parallel to the leading edge of the main blade part.

An inclined surface may be formed on the leading edge of the lower surface of the main blade part, and the dimple may be formed in the upper surface of the main blade part.

Advantageous Effects

The blender of the present disclosure has the following effects.

First, in the blender of the present disclosure, the blade assembly configured to crush the food may be provided with the auxiliary blade in addition to the main blade. Accordingly, food may be cut or crushed doubly by the auxiliary blade and the main blade, thereby improving the crushing efficiency of food.

Second, in the blender of the present disclosure, the blade part of the auxiliary blade may be located between the blade parts of the main blade. Accordingly, the food contained in the container body may be cut by sequentially hitting the blade part of the auxiliary blade and the blade parts of the main blade, thereby reducing the load of a motor assembly. That is, the food may be cut or crushed with a smaller load of the motor assembly compared to the load of a motor assembly used when the food is cut by once hitting a blade.

Third, in the blender of the present disclosure, the auxiliary blade part of the auxiliary blade may be configured to have a length shorter than a length of the main blade part of the main blade. Accordingly, after the food having a predetermined size is located between the main blade parts and some of the food is cut by the auxiliary blade part, the entirety of the remaining part of the food or a larger part than the part of the food cut partially by the auxiliary blade part may be cut by the main blade parts, thereby preventing failures or errors due to overload of the motor assembly or the blade assembly.

Fourth, in the blender of the present disclosure, the auxiliary blade part of the auxiliary blade may be configured to bend more upward than the main blade part of the main blade. That is, the auxiliary blade part may be located at a center portion of a side upper than the main blade part. Accordingly, the auxiliary blade part which bends upward may prevent the cut food from gathering in the center of the container body or may cut the food gathering in the center and create a whirlwind to mix the food well.

Fifth, in the blender of the present disclosure, the main blade part may be provided with even-numbered main blade parts symmetrical to each other relative to a main holding part. The multiple main blade parts may have structures which bend upward or downward from the main holding part, and the auxiliary blade part may bend more upward than the main blade parts. Accordingly, a part in which the food is crushed by the blade parts of the blade assembly may extend up to the lower and middle parts of the container body, thereby increasing the crushing efficiency of the food.

Sixth, in the blender of the present disclosure, the main blade part constituting the blade may be configured to be inclined such that the leading edge part of the blade is located at a position higher than the rear edge part thereof. Accordingly, the food and fluid may be pushed downward by the blade due to the rotation of the blade, thereby crushing the food and at the same time, moving the food.

Seventh, in the blender of the present disclosure, the dimple may be formed in the blade. That is, the dimple may be formed in the upper or lower surface of the main blade part of the blender of the present disclosure. Accordingly, the contact area of the blade with food (food ingredients) may decrease, so the food may be prevented from sticking to the surface of the blade. Thus, the efficiency of mixing and crushing the food may be improved.

Eighth, in the blender of the present disclosure, due to the dimple formed in the blade, the food may slide from the surface of the blade without sticking thereto such that the contact resistance of the surface of the blade decreases, so the load and noise of a motor may decrease. That is, in the blender of the present disclosure, due to the formation of the dimple, the amount of the food sticking to the surface of the blade may decrease, thereby decreasing the load and noise generated by the blade.

Ninth, in the blender of the present disclosure, the dimple may be formed at a position near the leading edge of the blade. Accordingly, due to the dimple, the vortex of fluid may be prevented. That is, when the dimple is formed at a position far from the leading edge of the blade or in the rear edge of the blade, noise may be generated due to the vortex and flow separation occurring in the area of the dimple, but in the blender of the present disclosure, such a problem is solved.

Tenth, in the blender of the present disclosure, multiple dimples may be formed to be parallel to the leading edge of the blade. That is, the multiple dimples may be formed side by side in the same distances from the leading edge of the blade. Accordingly, during the rotation of the blade, the flow path of fluid may be formed uniformly as a whole, thereby decreasing load and noise.

DETAILED DESCRIPTION

Hereinafter, a blender of the present disclosure will be described in detail with reference to the accompanying drawings.

Figure 1:
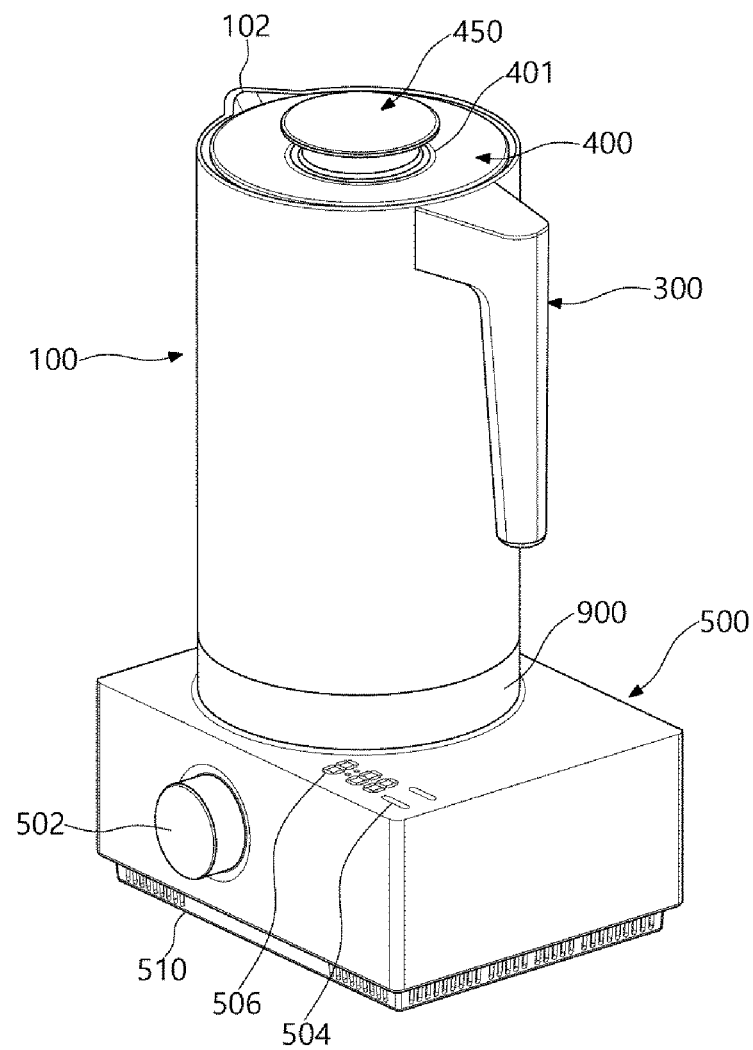
FIG. 1 is a perspective view illustrating a configuration of a blender according to an exemplary embodiment of the present disclosure.
Figure 2:
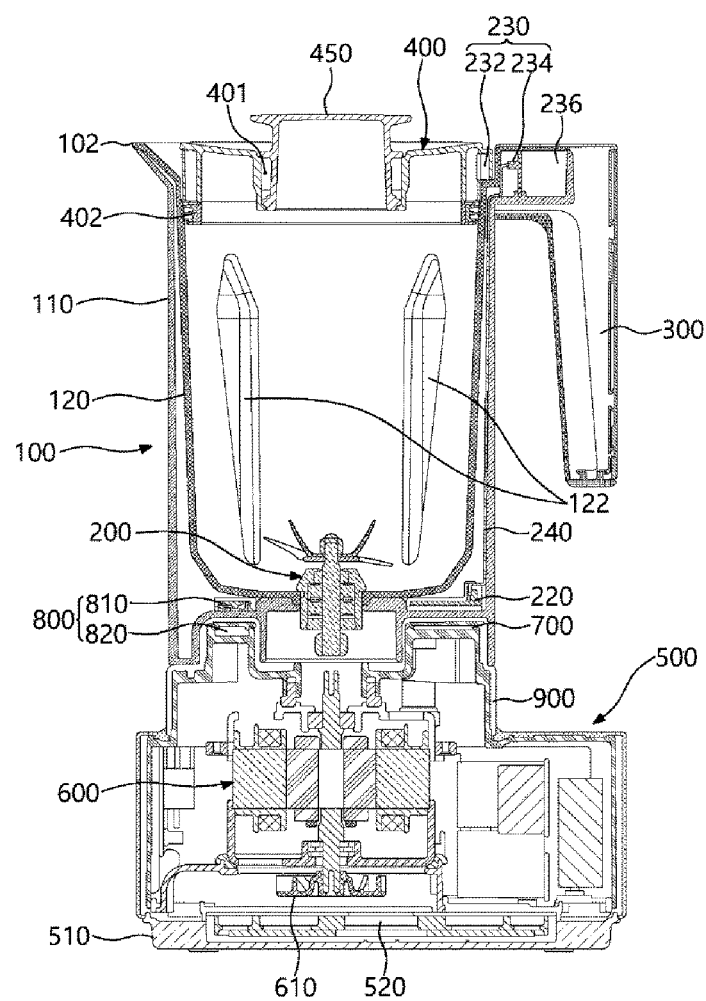
FIG. 2 is a vertical sectional view illustrating an internal configuration of the blender according to the embodiment of the present disclosure.

FIGS. 1 and 2 are a perspective view and a vertical sectional view, respectively, illustrating a configuration of the blender according to a first embodiment of the present disclosure.

As illustrated in these drawings, the blender of the present disclosure may include a container body 100 located relatively at an upper side thereof and receiving food, and a main body 500 provided at a lower side of the container body 100 and supporting the container body 100.

The container body 100 may be a part in which food is received and the process of cutting or crushing the food occurs, and the main body 500 may support the container body 100. Furthermore, multiple parts may be provided inside such a main body 500 to control the cutting or crushing of the food received in the container body 100, or to supply electric power.

The container body 100 may have a cylindrical shape as a whole, and an upper surface thereof may be configured to be open to introduce food thereinto.

The container body 100 may be made of a transparent material such that an inside thereof can be seen from the outside. That is, the container body 100 may be made of glass or transparent plastic so that a user can check the state of the food contained inside the container body 100 from the outside.

A blade assembly 200 may be provided in an inner lower portion of the container body 100. The blade assembly 200 may have multiple blades mounted rotatably thereto such that the blades chop or crush the food received in the container body 100.

The blade assembly 200 may be connected to a motor assembly 600 to be described below, and be configured to be rotated by a rotational force generated by the motor assembly 600.

The container body 100 may be formed doubly. That is, the container body 100 may be composed of an outer container body 110 constituting the appearance thereof and an inner container body 120 provided inside the outer container body 110. The outer container body 110 and the inner container body 120 may be configured to be in contact with each other or to be spaced apart from each other by a predetermined distance. Furthermore, only a portion of each of the outer container body 110 and the inner container body 120 may be configured to be in contact with each other.

At least one inner guide 122 may be provided in the container body 100 to have a predetermined length in a vertical direction. The inner guides 122 are intended to guide the food rotating in the container body 100, and may be configured in pairs symmetrical to each other in a front and rear or left and right of the inner container body 120.

A handle 300 grasped by a user may be formed by protruding from a right surface of the container body 100 to the right side. Such a handle 300 may be formed such that a user can grasp the handle with one hand, and in the present disclosure, an upper end of the handle is illustrated to be connected integrally to an upper surface of the container body 100.

Meanwhile, a spout 102 may be formed at an opposite side to the handle 300.

As illustrated in the drawing, the spout 102 may be formed on an upper end of a left surface of the container body 100, and may be a part through which the food completely crushed in the container body 100 is guided to be easily poured to the outside. Accordingly, such a spout 102 may be formed to gradually protrude more in the left direction going upward.

The upper surface of the container body 100 may be covered by a container lid 400. That is, the container lid 400 may be removably mounted to the upper surface of the container body 100, and open and close the upper surface of the container body 100.

The container lid 400 may cover the upper surface of the container body 100 such that the food contained in the container body 100 does not spill to the outside and foreign matter from the outside is not introduced into the container body 100.

The container lid 400 may be configured to be mounted to the container body 100 by pressing or rotating the container lid 400 by a user. A gasket 402 may be provided in an outer circumferential surface of the container lid 400 to block a gap between the container lid 400 and the container body 100. Of course, such a gasket 402 may function to allow the container lid 400 to be pressed and fitted to the container body 100.

A cap 450 may be provided in the container lid 400. That is, a lid hole 401 which is a circular hole having a predetermined size may be formed vertically through the center of the container lid 400, and the cap 450 may be mounted to such a lid hole 401 and cover the lid hole 401.

As illustrated in the drawings, the cap 450 may be installed at the center of the container lid 400, and as a whole, may be formed to have a diameter smaller than a diameter of the container lid 400. The cap 450 may be removably mounted to the container lid 400 by forcible fitting by pressing or by rotating.

In the present disclosure, it is illustrated that the cap 450 is configured to be attached and detached from the container lid 400 by being rotated, and a detailed configuration thereof will be described below.

Since the cap 450 may be removably mounted to the container lid 400, a user may see the food contained inside the container body 100 by opening only the cap 450 without opening the container lid 400, and insert the food into the container body 100 by opening the cap 450, or insert a mixing rod thereinto and stir the food contained inside the container body 100.

The upper end of the cap 450 may be configured by protruding toward an upper side more than the upper end of the container lid 400, so that the cap 450 may function as a handle of the container to be grasped by a user when the user opens or closes the container lid 400.

As illustrated in the drawings, the main body 500 may be configured to have a hexahedral shape having the shape of a rectangular barrel as a whole and be provided under the container body 100 so as to support the container body 100, wherein the motor assembly 600 and multiple electronic parts such as a PCB (a printed circuit board) may be installed inside the main body 500. Of course, the external shape of such a main body 500 may be variously changed as required.

The motor assembly 600 may be provided at a center of an inside of the main body 500. The motor assembly 600 may generate a rotational force by power supplied from the outside so that the blades 206 constituting the blade assembly 200 rotate.

Accordingly, a lower end of the blade assembly 200 may be connected to an upper end of the motor assembly 600.

A knob 502 may be provided on a front surface of the main body 500 by protruding forward therefrom. The knob 502 is intended to set the operation of the blender of the present disclosure, and may be rotatably mounted to the main body 500.

The knob 502 may be configured to control the operation intensity of the motor assembly 600. That is, the knob 502 may be configured to change the rotational speed of the motor assembly 600 to high speed or low speed by the clockwise or counterclockwise rotation of the knob 502.

Meanwhile, a manipulation part 504 may be provided on the upper surface of the main body 500.

The manipulation part 504 is intended to manipulate the blender of the present disclosure by touching, and may be configured to manipulate the starting and stopping of the operation of the blender.

Of course, the knob 502 and the manipulation part 504 may be configured to selectively set or manipulate the operation of the blender, or may be configured to overlap each other in the functions of the setting and manipulating. That is, for convenience, the knob 502 and the manipulation part 504 may be configured to overlap with each other in the functions such that a user may select any one of the knob 502 or the manipulation part 504 to set or manipulate the operation of the blender.

A display part 506 may be provided at a side of the manipulation part 504 (a left side in FIG. 1). That is, the display part 506 may be provided on the upper surface of the main body 500. Such a display part 506 may function to display the state of the operation of the blender such that a user can check the state thereof. Accordingly, such a display part 506 may be configured as a seven-segment display.

A cooling fan 610 may be provided at a lower side of the motor assembly 600.

The cooling fan 610 may be connected to the lower end of the motor assembly 600 and be rotated by the rotating force generated by the motor assembly 600, thereby introducing an outside air into the main body 500 and forcing the flow of the air. Accordingly, the cooling fan 610 may allow air to be introduced into the main body 500 from the outside and to flow therein, and function to cool parts such as the PCB provided in the main body 500.

A base end 510 may be provided on the lower surface of the main body 500.

The base end 510 may be formed by protruding downward from the lower surface of the main body 500 and may have a space having a predetermined size therein to receive a wireless power module 520. The wireless power module 520 may function to receive external wireless power in a wireless method using induced electromotive force and to supply the wireless power to the motor assembly 600 provided inside the main body 500.

Meanwhile, a detection system may be provided in the main body 500 and the container body 100 described above so as to detect whether the container lid 400 is mounted to the container body 100.

The detection system may allow an electric circuit (not shown) which can be turned on and off to be formed in the container body 100, and allow such an electric circuit to form a closed circuit, so that the detection system may be configured to detect whether electric current flows in the closed circuit by voltage supplied by the main body 500.

More particularly, the detection system may include: a power transmission part 700 provided in the main body 500 and supplying power to the container body 100; a power reception part 220 provided in the container body 100 and receiving the power supplied by the power transmission part 700; an on/off part 230 provided at the upper side of the container body 100 and turning on/off the electric circuit formed in the container body 100 depending on whether the container lid 400 is closed; a transparent electrode film 240 made of a transparent material provided on a surface of the container body 100 and connecting the power reception part 220 and the on/off part 230 to each other so as to allow electricity to flow therebetween; and a detection part 800 provided on one side of the main body 500 or the container body 100 and allowing the electric circuit formed by the connection of the power reception part 220 with the on/off part 230 to form the closed circuit so as to detect whether the current flows.

The power transmission part 700 is intended to transmit power, which is introduced to the main body 500 from the outside of the main body 500 or stored in advance in the main body 500, to the container body 100, and may use an induction coil in which an induced electromotive force can be generated.

The power reception part 220 is intended to receive the power transmitted from the main body 500, and may be configured to have a structure corresponding to the structure of the power transmission part 700. That is, the power reception part 220 may use the coil such that the power is transmitted by the induced electromotive force generated between the power transmission part 700 and the power reception part 220.

The power transmission part 700 and the power reception part 220 may be located to be adjacent to each other so as to generate the induced electromotive force. Accordingly, in the present disclosure, the power transmission part 700 is illustrated to be mounted to the right upper end of the main body 500, and the power reception part 220 is illustrated to be mounted to the right lower end of the container body 100.

The on/off part 230 may be configured to turn on/off the electric circuit (not shown) formed in the container body 100 depending on whether the container lid 400 is mounted to the container body 100, and may include a permanent magnet 232 and a reed switch 234 provided in the container lid 400 and the container body 100, respectively.

As illustrated in FIG. 2, in the present disclosure, the permanent magnet 232 is illustrated to be mounted to the right edge of the container lid 400, and the reed switch 234 is illustrated to be mounted to the right upper end (a portion of the handle) of the container body 100.

More particularly, the reed switch 234 may be mounted to be received in a reed switch groove 236 formed in the upper end portion of the handle 300.

It is widely known that the reed switch has magnetic movable contacts enclosed in a glass tube, and when a magnet approaches the reed switch, the contacts in the glass tube contact with each other. Here, further detailed description of the configuration and principle of the reed switch will be omitted.

Of course, except for the use of the permanent magnet 232 and the reed switch 234 of such an on/off part 230, other electric on/off part or mechanical structures may be used to turn on/off the electric circuit, and the mounting positions of the permanent magnet 232 and the reed switch 234 respectively mounted to the container lid 400 and the container body 100 may be exchanged oppositely.

Various types of electrical devices or structures having a function that can detect whether electric current flows in the electric circuit formed in the container body 100 turned on/off by the on/off part 230 may be used as the detection part 800. However, in the present disclosure, a photosensor is used to detect light as an example.

Accordingly, the detection part 800 may include a light transmission module 810 provided in the container body 100 to generate light, and a light reception module 820 provided in the main body 500 to receive the light transmitted by the light transmission module 810.

The light transmission module 810 and the light reception module 820 may be located at positions adjacent to each other. In the present disclosure, as illustrated in FIG. 2, the light transmission module 810 may be located on the left lower end of the container body 100, and the light reception module 820 may be located on the left upper end of the main body 500.

The light transmission module 810 may include an LED (light emitting diode) that emits light by electricity, and the light reception module 820 may include a photosensor that receives light and changes the light into an electrical signal.

In addition, the transparent electrode film 240 may be provided between the outer container body 110 and the inner container body 120. More particularly, the transparent electrode film 240 may be attached to the inner surface of the outer container body 110.

The transparent electrode film 240 may be made of a transparent material such as an ITO film (an indium-tin oxide film) and may be attached to the surface of the container body 100, and may allow the on/off part 230 provided on the upper side of the container body 100 to be connected to the power reception part 220 and the light transmission module 810 provided on the lower end portion of the container body 100 so as to form the electric circuit.

Accordingly, the transparent electrode film 240 may be attached vertically and longitudinally on the surface of the container body 100 made of a transparent material and may function to guide the transmission of the electrical signal between the upper end and lower end of the container body 100.

Accordingly, when the container body 100 is made of the transparent material, and the transparent electrode film 240 is also made of the transparent material, and the transparent electrode film 240 is not visually exposed, so the transparent material does not taint the appearance of the container body 100 and may maintain the design thereof.

Furthermore, when the transparent electrode film 240 is attached to the surface of the container body 100, the transparent electrode film 240 may have a hole formed therein to remove air bubbles that may be generated between the attached surfaces. That is, a perforated hole may be added to the center of the transparent electrode film 240 made of the ITO film to allow the air bubbles to escape therethrough such that the generation of the air bubbles is prevented.

Meanwhile, a seating step 900 may be formed on the upper surface of the main body 500 by protruding upward therefrom.

The seating step 900 may be configured to have a circular shape corresponding to a shape of the lower end of the container body 100 such that the lower end of the container body 100 is mounted to the seating step 900 to be vertically removable therefrom.

In addition, the container body 100 may be formed doubly. That is, the container body 100 may be composed of the outer container body 110 and the inner container body 120, and the inner guide 122 may be formed on the inner surface of the inner container body 120 by protruding inward therefrom.

Hereinafter, a configuration of the container body 100 will be described in detail.

Figure 3:
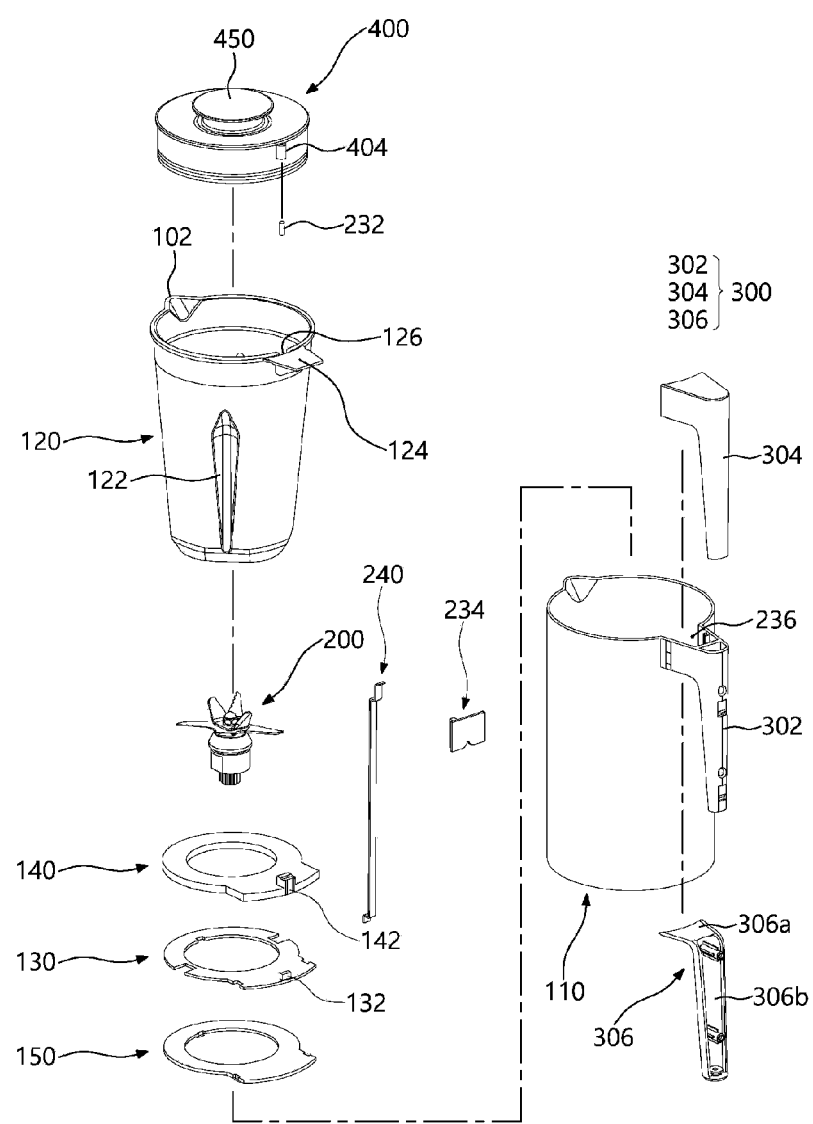
FIG. 3 is an exploded perspective view illustrating a detailed configuration of a container body according to an embodiment of the present disclosure.
Figure 4:
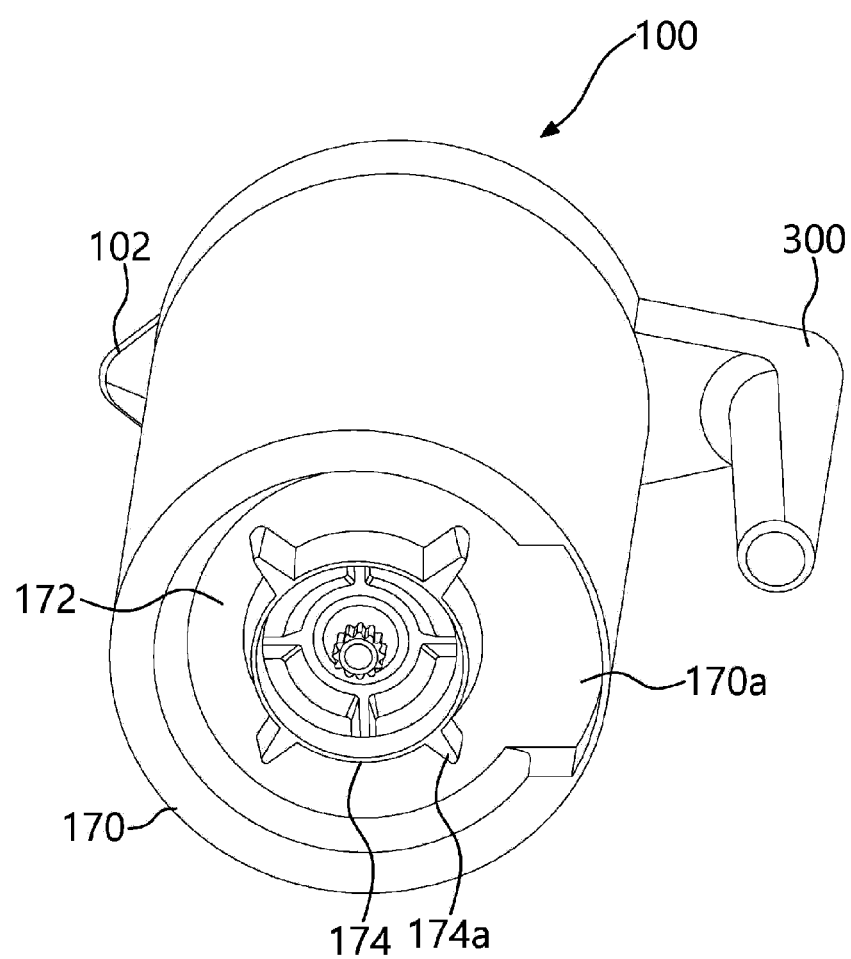
FIG. 4 is a bottom perspective view of the container body according to the embodiment of the present disclosure.

FIG. 3 is an exploded perspective view of the container body 100, and FIG. 4 is a bottom perspective view of the container body 100.

As illustrated in these drawings, the container body 100 may be doubly configured to have a cylindrical shape as a whole. That is, the container body 100 may include the outer container body 110 constituting the appearance thereof, and the inner container body 120 is provided inside the outer container body 110.

The container body 100, that is, the outer container body 110 and the inner container body 120 may be made of a transparent material. That is, the container body 100 may be made of a transparent material such as glass, Tritan, or transparent plastic so that a user can check the state of the food contained inside the container body 100 from the outside.

The outer container body 110 may constitute the appearance of the container body, and be configured to have a cylindrical shape with the same top and bottom sizes, and a main handle 302 may be formed at the outer right surface thereof by protruding therefrom to the right such that a user can grasp the handle.

The main handle 302 may be formed to have an L shape, and the upper end portion thereof may be connected to the right upper end of the outer container body 110. The main handle 302 may be formed integrally with the outer container body 110 by injection molding. Accordingly, the main handle 302 formed integrally with the outer container body 110 may have improved strength and durability compared to the main handle formed as a part separate from the outer container body 110 to be fixed thereto.

The reed switch groove 236 receiving the reed switch 234 may be formed in a portion at which the main handle 302 is connected to the container body 100. That is, the reed switch groove 236 may be formed in the upper end of the main handle 302, and may provide space to mount the reed switch 234 therein, and the left of such a reed switch groove 236 may be open.

An outer handle 304 and an inner handle 306 may be provided on the outer sides of the main handle 302. That is, as illustrated in FIG. 3, the outer handle 304 may be provided at the right of the main handle 302, and the inner handle 306 may be provided at the left of the main handle 302.

More particularly, the outer handle 304 may also be configured to have an L shape as a whole as does the main handle 302, and to cover the upper surface, right surface, and front and rear surfaces of the main handle 302. The outer handle 304 may be made of a material such as stainless steel that has a smooth surface and is resistant to rust, and may not break easily and look beautiful to a user.

The inner handle 306 may cover the left surface and lower surface of the main handle 302, and may be configured to have an L shape so as to correspond to the left and lower surfaces of the main handle 302, and at least a portion thereof may be made of an elastic material.

Particularly, the inner handle 306 may include a connection part 306a covering the lower part of the upper end of the main handle 302, and a grasping part 306b extending downward from the connection part 306a and covering the left surface of the main handle 302.

Like the outer handle 304, the connection part 306a may be made of a smooth and strong material, and the grasping part 306b may be a part on which a user's fingers are wrapped, and be made of an elastic material. That is, the connection part 306a may be made of stainless steel, and the grasping part 306b may be made of an elastic material such as rubber that can give a user a soft touch since the user's four fingers (except for the thumb) cover the grasping part.

The inner container body 120 may be configured to have a size (a diameter) smaller than a size (a diameter) of the outer container body 110 and may sit inside the outer container body 110.

The inner container body 120 may be configured to have a cylindrical shape having an open upper part. More particularly, as illustrated in the drawings, the inner container body 120 may be configured to have a tapered shape having a diameter gradually decreasing going toward the lower side thereof.

In addition, the multiple inner guides 122 may be vertically formed on the inner surface of such an inner container body 120 as described above, and the blade assembly 200 may be mounted to the lower end of the inner container body 120.

The spout 102 may be formed on the left upper end of the inner container body 120 by protruding therefrom to the left, and a covering end 124 may be formed on the right upper end of the inner container body 120 by extending therefrom to the right.

The covering end 124 may cover the upper surface of the reed switch groove 236 of the outer container body 110. The covering end 124 may be configured to be a flat plate having a predetermined thickness, and to have width gradually decreasing going toward the right to correspond to the size of the upper end of the reed switch groove 236.

The blade assembly 200 may be mounted to the lower end of the inner container body 120.

The blade assembly 200 allows the food to be finely crushed or mixed by the blades, and the blades configured to be rotated by receiving rotational power from the motor assembly 600 so as to crush the food may be installed to protrude upward from the bottom surface of the inner container body 120.

A magnet holder 404 may be provided on the outer circumferential surface of the container lid 400. That is, as illustrated in FIG. 3, the magnet holder 404 may be formed on the outer circumferential surface of the container lid 400 by protruding therefrom to the outside, and have the permanent magnet 232 mounted therein.

The permanent magnet 232 is intended to control the turning on/off of the reed switch 234 when the container lid 400 is mounted to or removed from the container body 100.

A coil holder assembly may be provided between the outer container body 110 and the inner container body 120.

The coil holder assembly may include a coil holder 130 having an induction coil, and an upper cover 140 and a lower cover 150 covering the upper and lower sides of the coil holder 130, respectively.

Particularly, the coil holder 130 may be provided between the bottom surface of the outer container body 110 and the lower surface of the inner container body 120, and the power reception part 220 and the light transmission module 810 may be mounted to such a coil holder 130.

The entirety of the coil holder 130 may have a shape of a circular ring having a predetermined thickness, and the power reception part 220 may be provided at the right end of the coil holder 130 having such a ring shape. That is, although not shown in detail, the induction coil which receives power may be provided at the right end of the coil holder 130, and constitute the power reception part 220.

The power reception part 220 mounted to the coil holder 130 may be embodied with the reception induction coil patterned on the same plane as the PCB. That is, in the power reception part 220 according to the first embodiment of the present disclosure, the reception induction coil provided on the lower surface of the coil holder 130 may be configured to be wound multiple times on the PCB in a spiral shape relative to a reception center point.

In addition, the light transmission module 810 may be provided on the lower surface of the coil holder 130.

The light transmission module 810 may emit light by power supplied from the power reception part 220. The light transmission module 810 may be configured as a part of the detection part 800, and use the LED emitting light as described above.

The power reception part 220 and the light transmission module 810 may be electrically connected to each other. That is, the power reception part 220 and the light transmission module 810 may be configured to form the closed circuit in cooperation with the on/off part 230. Accordingly, the power reception part 220 and the light transmission module 810 provided in the coil holder 130, and the on/off part 230 may be configured to be electrically connected to each other by the PCB.

In addition, although not shown, the coil holder 130 may further include a conversion module that converts alternating current (AC) to direct current (DC).

A holder terminal 132 may be provided on the upper surface of the right end of the coil holder 130.

The holder terminal 132 may be a part to which the lower end of the transparent electrode film 240 is inserted and connected.

As illustrated in FIG. 3, the coil holder 130 may be configured to have an approximate ring shape as a whole, and the right end of the coil holder 130 may be configured to be relatively large in width such that the power reception part 220 may be mounted thereto.

Multiple grooves may be formed in the outer circumferential surface and inner circumferential surface of the coil holder 130 such that hooks fixing multiple parts pass therethrough.

The coil holder 130 may be protected by the upper cover 140 and the lower cover 150. That is, the upper cover 140 and the lower cover 150 may be provided on the upper surface and lower surface of the coil holder 130, respectively, so as to cover the upper surface and lower surface thereof, the upper cover and lower cover having shapes corresponding to the upper surface and lower surface of the coil holder 130, respectively.

A terminal holder 142 may be formed on the right end of the upper cover 140 by protruding upward therefrom to receive the holder terminal 132 of the coil holder 130 therein. Accordingly, the holder terminal 132 may be received in the terminal holder 142 by being introduced thereto from the lower side of the terminal holder 142, and the upper part of such a terminal holder 142 may be formed to be partially open such that the lower end of the transparent electrode film 240 passes therethrough.

The hooks may be formed on the upper cover 140 such that the upper cover 140 is coupled to the lower cover 150.

As described above, the transparent electrode film 240 may be made of a transparent material such as the ITO film, and may be configured to have length corresponding to the vertical length of the container body 100.

The transparent electrode film 240 may be provided between the outer container body 110 and the inner container body 120. Accordingly, when the transparent electrode film 240 is provided between the outer container body 110 and the inner container body 120, the transparent electrode film 240 may be prevented from coming in contact with the food contained in the inner container body 120, and may be prevented from coming in contact with foreign matter outside of the outer container body 110.

The transparent electrode film 240 may be attached to the surface of the outer container body 110, or the surface of the inner container body 120. That is, the transparent electrode film 240 may be attached to the inner surface of the outer container body 110 or the outer surface (an outer circumferential surface) of the inner container body 120.

Here, the transparent electrode film 240 attached vertically to the inner surface of the outer container body 110 will be described as an example.

As illustrated in FIG. 3, the upper and lower ends of the transparent electrode film 240 may be bent at least one time. The lower end of the transparent electrode film 240 may pass through the terminal holder 142 of the upper cover 140 and be connected to the holder terminal 132 of the coil holder 130, and the upper end of the transparent electrode film 240 may be connected to the reed switch 234.

A film guide may be formed vertically on the inner surface of the outer container body 110 to attach the transparent electrode film 240 thereto. That is, the film guide may be formed vertically and longitudinally on the right inner surface of the outer container body 110 and may guide the attachment of the transparent electrode film 240.

A magnet groove 126 may be formed in the upper end of the inner container body 120 by being recessed therefrom to the outside so as to receive the permanent magnet 232 therein. That is, the upper end of the right surface of the inner container body 120 may be bent to be stepped to the right so as to form the magnet groove 126, and such a magnet groove 126 may be a part in which the permanent magnet 232 is located.

Meanwhile, the lower surface of the container body 100 may be configured to have a shape corresponding to the shape of the upper surface of the main body 500 such that the container body 100 may be easily attached to and detached from the upper surface of the main body 500.

More particularly, the container body 100 may be mounted to the seating step 900 of the main body 500 to be described below.

Accordingly, the lower surface of the container body 100 may be configured to have the shape corresponding to the shape of the upper end of the main body 500, so the container body 100 may be stably mounted to and removed from the main body 500.

A container body end 170 having a predetermined width may be formed on the lower surface of the container body 100 by protruding downward therefrom. The container body end 170 may be a part which is in contact with the upper surface of a lower step 910 of the main body 500 to be described below, and may be configured to have a shape corresponding to the upper surface of the lower step 910.

An upper step receiving groove 172 may be formed in the center of the lower surface of the container body 100 by being recessed upward therefrom. That is, the upper step receiving groove 172 may be formed by being recessed upward at the inner side of the container body end 170 of the container body 100. When the container body 100 is mounted to the main body 500, an upper step 920 of the main body 500 to be described below may be received in such an upper step receiving groove 172.

The container body end 170 may have the shape of a circular ring having a partially open part, and the open part may be a part in which a coil seating part 940 to be described below is received. That is, the right end of the container body end 170 may be open and a coil seating part groove 170a may be formed therein. The coil seating part 940 to be described below may be received in such a coil seating part groove 170a.

A circular end 174 may be formed on the center of the lower surface of the container body 100 by protruding downward therefrom. That is, the circular end 174 protruding downward may be provided in the center of the upper step receiving groove 172.

As illustrated in FIG. 4, the circular end 174 may have the shape of a circular ring and be hollow therein, which may provide a passage connecting the blade assembly 200 to the motor assembly 600.

The circular end 174 may be a part received in a circular end receiving groove 980 formed in the main body 500 to be described below.

Multiple mounting protrusions 174a may be formed on the outer circumferential surface of the circular end 174 by protruding radially therefrom. Each of the mounting protrusions 174a may function to tightly mount the container body 100 to the corresponding position of the main body 500 such that the container body 100 does not rotate. The mounting protrusion 174a may have at least one mounting protrusion 174a.

In the present disclosure, the mounting protrusion 174a is illustrated to have four mounting protrusions 174a. As illustrated in FIG. 4, such a mounting protrusion 174a may be formed to have thickness gradually decreasing going toward the outside. This is intended to easily receive the mounting protrusions 174a in protrusion grooves 982 to be described below.

Figure 5:
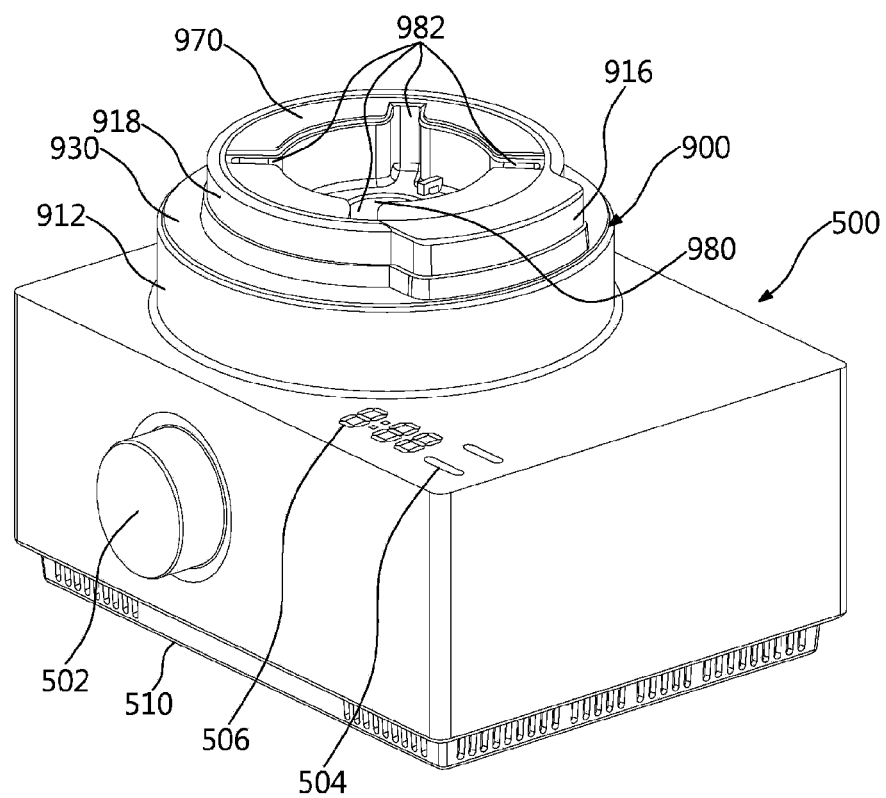
FIG. 5 is a perspective view of a main body according to an embodiment of the present disclosure.
Figure 6:
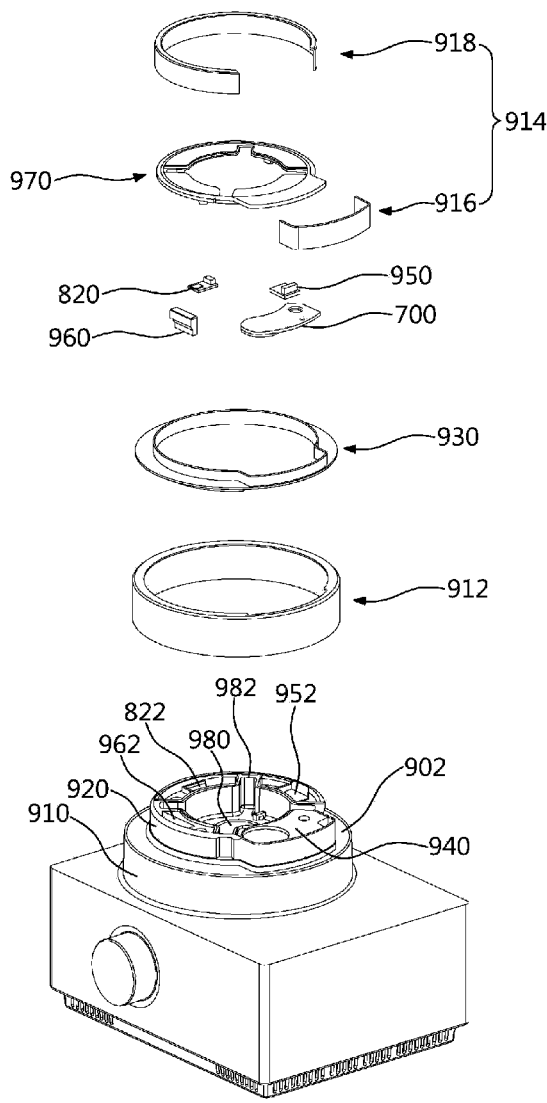
FIG. 6 is an exploded perspective view illustrating a configuration of an upper half part of the main body according to the embodiment of the present disclosure.
Figure 7:
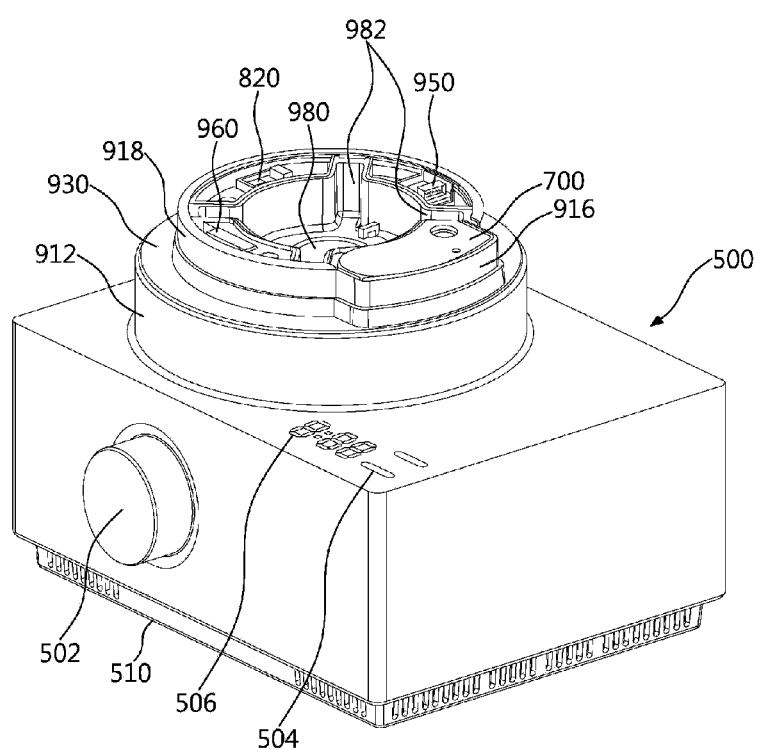
FIG. 7 is a perspective view illustrating a configuration of the main body from which a cover is removed according to the embodiment of the present disclosure.

In FIGS. 5 to 7, a configuration of the upper half part of the main body 500 is illustrated in detail. That is, FIG. 5 is a perspective view of the main body 500; FIG. 6 is an exploded perspective view illustrating a configuration of an upper half part of the main body 500; FIG. 7 is a perspective view illustrating a configuration of the main body 500 from which the cover is removed.

As illustrated in these drawings, the seating step 900 may be provided on the upper surface of the main body 500 by protruding therefrom to be stepped upward such that the lower surface of the container body 100 is seated thereon.

The seating step 900 may be a part by which the lower end of the container body 100 is seated and be supported. Accordingly, such a seating step 900 may be configured to have the shape corresponding to the shape of the lower part of the container body 100.

Particularly, the seating step 900 may be formed by being stepped, and may include the lower step 910 having a diameter corresponding to the diameter of the lower end of the container body 100, and the upper step 920 formed by protruding upward from the lower step 910 and having a diameter smaller than the diameter of the lower step 910.

As illustrated in the drawing, the lower step 910 may be configured to have a circular shape and a predetermined height, and the upper step 920 having a diameter smaller than the diameter of the lower step 910 may be formed on the upper part of such a lower step 910 by protruding upward therefrom to have a predetermined height. Accordingly, like the upper surface of the main body 500, a horizontal step surface 902 may be formed between the lower step 910 having the larger diameter and the upper step 920 having the smaller diameter.

A lower step ring 912 and an upper step ring 914 having shapes corresponding to the outer surfaces of the lower step 910 and the upper step 920, respectively, may be provided on the outer surfaces of the lower step 910 and the upper step 920, respectively. That is, the lower step ring 912 and the upper step ring 914 may be provided on the outer circumferential surfaces of the lower step 910 and the upper step 920, respectively, which have the outer surfaces of circular shapes, and may cover the outer surfaces (side surfaces) of the lower step 910 and the upper step 920.

The lower step ring 912 and the upper step ring 914 may protect parts there inside and may function as exterior materials. Accordingly, like the outer handle 304, the lower step ring 912 and the upper step ring 914 may be made of a material such as stainless steel which has a smooth surface and is resistant to rust.

In addition, an elastic member 930 made of an elastic material may be provided on the step surface 902 provided between the upper step 920 and the lower step 910. As illustrated in the drawing, the elastic member 930 may be configured to cover the step surface 902 formed on the upper surface of the lower step 910, and to cover the lower half part of the upper step 920.

The elastic member 930 may be made of an elastic material, and thus may function to buffer impact which may be generated when the container body 100 sits on the main body 500. That is, when the lower surface of the container body 100 sitting on the upper step 920 is in contact with the upper step 920, the elastic member 930 may function to prevent breakage or noise that may occur due to the collision of the lower surface of the container body 100 with the upper step 920 and the lower step 910 of the main body 500, which are made of solid materials.

Accordingly, the elastic member 930 may be made of a material such as rubber, and may function to make the seating of the container body 100 efficient. Further, the elastic member 930 may be made of a conductive rubber when required, and in this case, the conductive rubber may be provided even on the lower surface of the container body 100.

The power transmission part 700 and the light reception module 820 may be mounted to the upper surface of the upper step 920.

Particularly, the coil seating part 940 may be formed on the right surface of the upper step 920 by protruding therefrom to the right, and the power transmission part 700 may be mounted to the upper surface of such a coil seating part 940.

The power transmission part 700 may be located to be adjacent to the power reception part 220 provided in the container body 100, and may function to supply power to the power reception part 220. Accordingly, such a power transmission part 700 may be configured as an induction coil. That is, like the power reception part 220, the induction coil may be configured by being wound multiple times on the same plane, such as a PCB, in a spiral shape relative to a transmission center point (not shown).

In addition, although now shown in detail, the main body 500 may have an oscillation circuit part therein. Such an oscillation circuit part may generate current and apply the current to the power transmission part 700. Accordingly, a magnetic field may be formed in the power transmission part 700 by the applied current. Furthermore, the oscillation circuit part may change the intensity of the current applied to the power transmission part 700, and thus the magnetic field may be changed in the power transmission part 700 by the change of the current intensity.

Accordingly, as in the present disclosure, with the power reception part 220 and the power transmission part 700 installed to vertically correspond to each other, as the intensity of current applied to the power transmission part 700 changes, the magnetic field of the power transmission part 700 may be changed, and a magnetic flux passing through the power reception part 220 may be changed due to inductive coupling between the power transmission part 700 and the power reception part 220, so the induced electromotive force may be generated in the power reception part 220. Furthermore, such an induced electromotive force may be supplied to the light transmission module 810.

The light reception module 820 may be provided at a side opposite to the power transmission part 700. That is, the light reception module 820 may be mounted in a receiving groove 822 formed in the left end of the upper surface of the upper step 920, which is a position vertically corresponding to the light transmission module 810 mounted to the container body 100.

Particularly, the receiving groove 822 having a predetermined size may be formed in the left end of the upper surface of the upper step 920 by being depressed therefrom, and the light reception module 820 may be mounted in such a receiving groove 822.

As described above, the light reception module 820 may include the photosensor. The light reception module 820 may receive light transmitted by the light transmission module 810, and transmit a light reception signal.

In addition, a Hall sensor 950 and a container body detection switch 960 may be provided on the upper surface of the upper step 920. That is, a container body switch groove 962 and a sensor groove 952 may be formed in the front end portion and rear end portion of the upper surface of the upper step 920, respectively, by being depressed therefrom, and the container body detection switch 960 and the Hall sensor 950 may be mounted in the container body switch groove 962 and the sensor groove 952, respectively.

The container body detection switch 960 may be configured as a reed switch, and may detect whether the container body 100 is seated on the upper surface of the main body 500. When such a container body detection switch 960 is provided, a magnet corresponding thereto may be provided on the lower end of the container body 100.

The Hall sensor 950 is intended to determine a type of the container body 100 sitting on the main body 500, and even in this case, a signal transmission part corresponding thereto may be required on the lower surface of the container body 100.

The upper step ring 914 mounted to the edge of the upper step 920 may be configured to be divided into two parts. That is, as illustrated in FIG. 6, the upper step ring 914 may include a protruding piece 916 covering the outer surface of the coil seating part 940 formed on the right surface of the upper step 920 by protruding therefrom to the right, and a curved piece 918 covering the remaining outer surface of the upper step 920.

Meanwhile, the upper part of the upper step 920 may be covered by a cover 970. Accordingly, the power transmission part 700, the light reception module 820, the container body detection switch 960, and the Hall sensor 950 mounted to the upper step 920 may be covered and protected by the cover 970.

In addition, the seating step 900 may have a center vertically formed therethrough such that the blade assembly 200 of the container body 100 and the motor assembly 600 provided in the main body 500 may be connected to each other.

More particularly, the circular end receiving groove 980 may be formed in the center portion of the upper step 920 by being depressed therefrom, and the circular end 174 of the lower end of the container body 100 described above may be received in such a circular end receiving groove 980. That is, the upper step 920 may have the shape of a circular ring as a whole, and the circular end receiving groove 980 having a circular shape may be formed in the center portion of such an upper step 920.

At least one protrusion groove 982 may be formed in the inner surface of the upper step 920. The protrusion groove 982 may be formed by being depressed radially from the circular end receiving groove 980, and the mounting protrusions 174*a* of the container body 100 may be seated in the protrusion grooves 982.

Accordingly, the protrusion grooves 982 may be configured to have the size and number thereof corresponding to the size and number of the mounting protrusions 174*a*, and the size of the width of the protrusion groove 982 may be configured to be the same as or larger than the size of the width of the mounting protrusion 174*a*.

Figure 8:
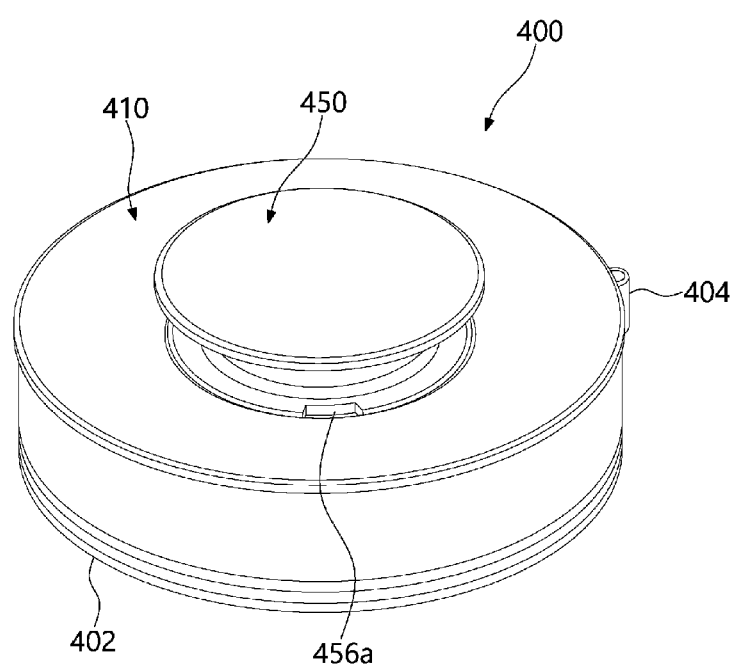
FIG. 8 is a perspective view illustrating an example of a container lid according to an embodiment of the present disclosure.
Figure 9:
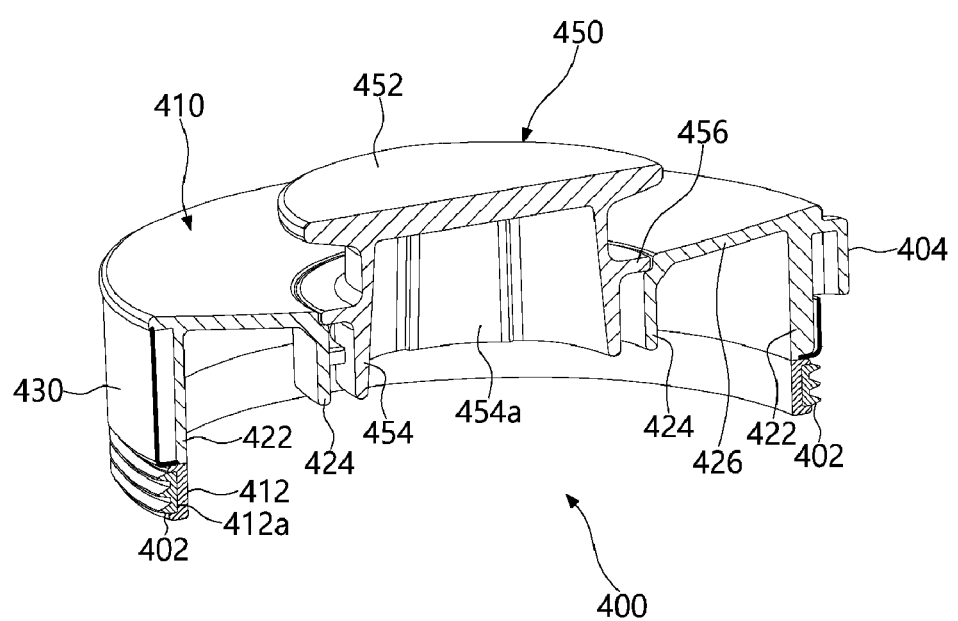
FIG. 9 is a cutaway perspective view illustrating an internal configuration of the container lid illustrated in FIG. 8.
Figure 10:
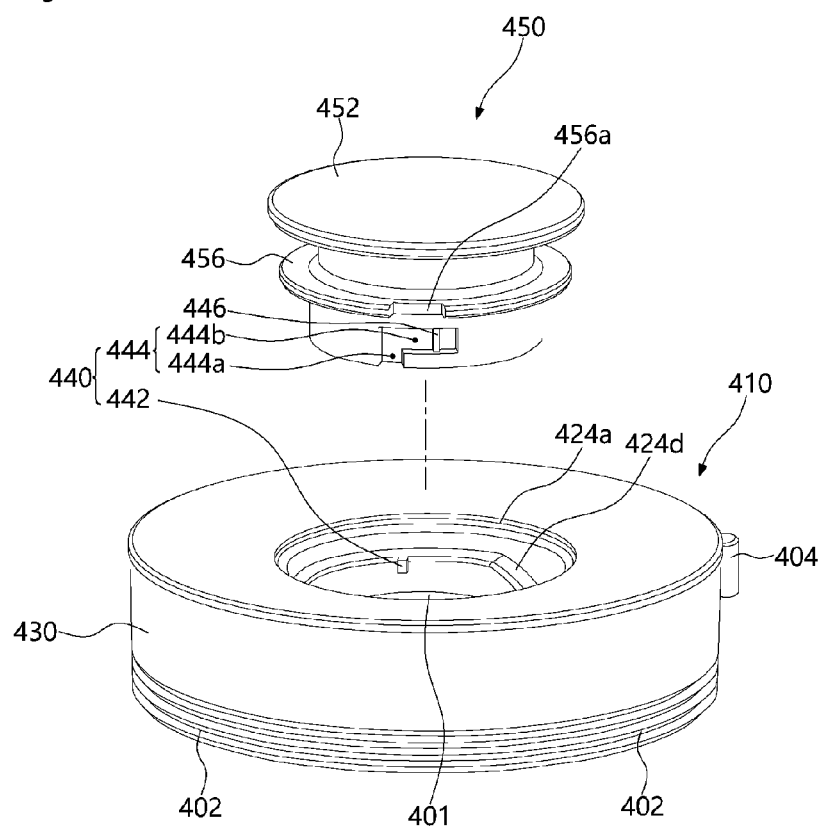
FIG. 10 is a top exploded perspective view illustrating a configuration of the container lid of FIG. 8.
Figure 11:
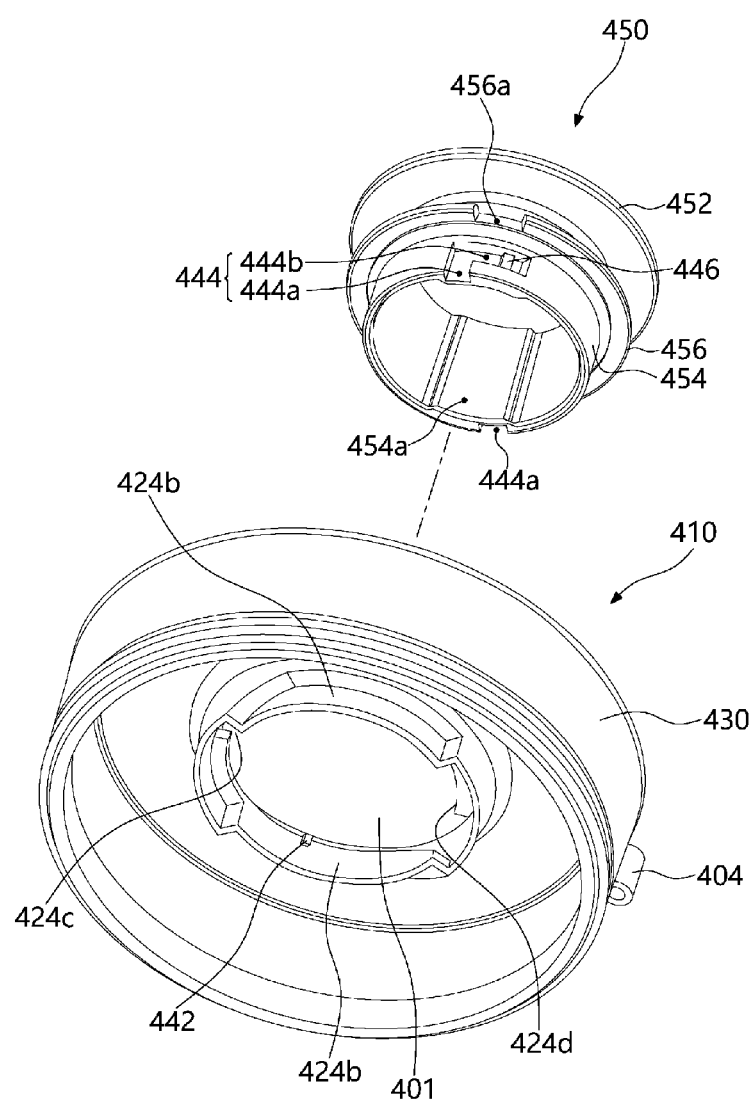
FIG. 11 is a bottom exploded perspective view illustrating a configuration of the container lid of FIG. 8.
Figure 12:
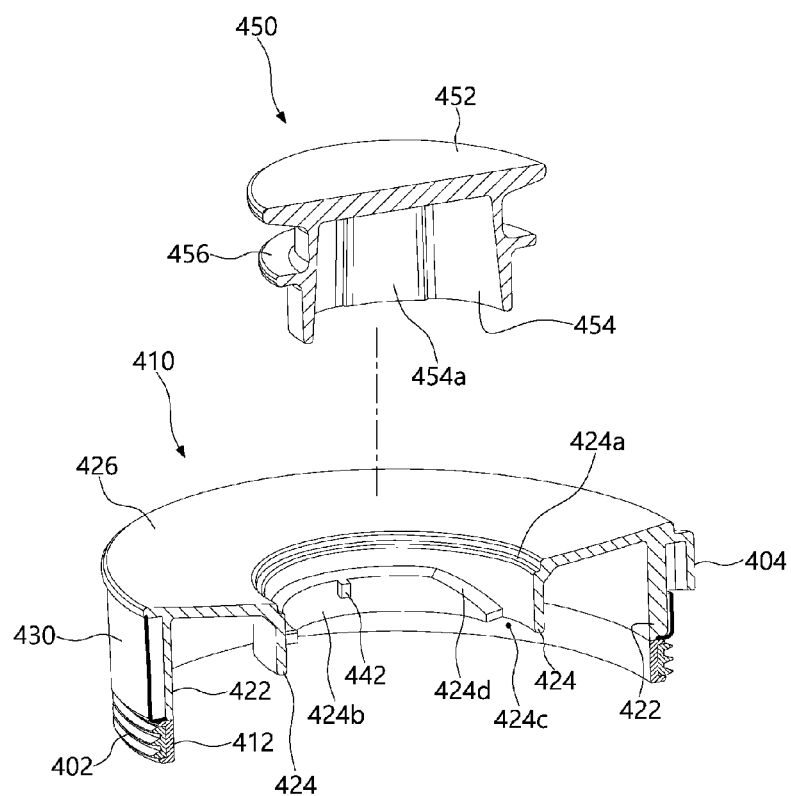
FIG. 12 is a cutaway exploded perspective view illustrating an internal configuration of the container lid of FIG. 8.
Figure 13:
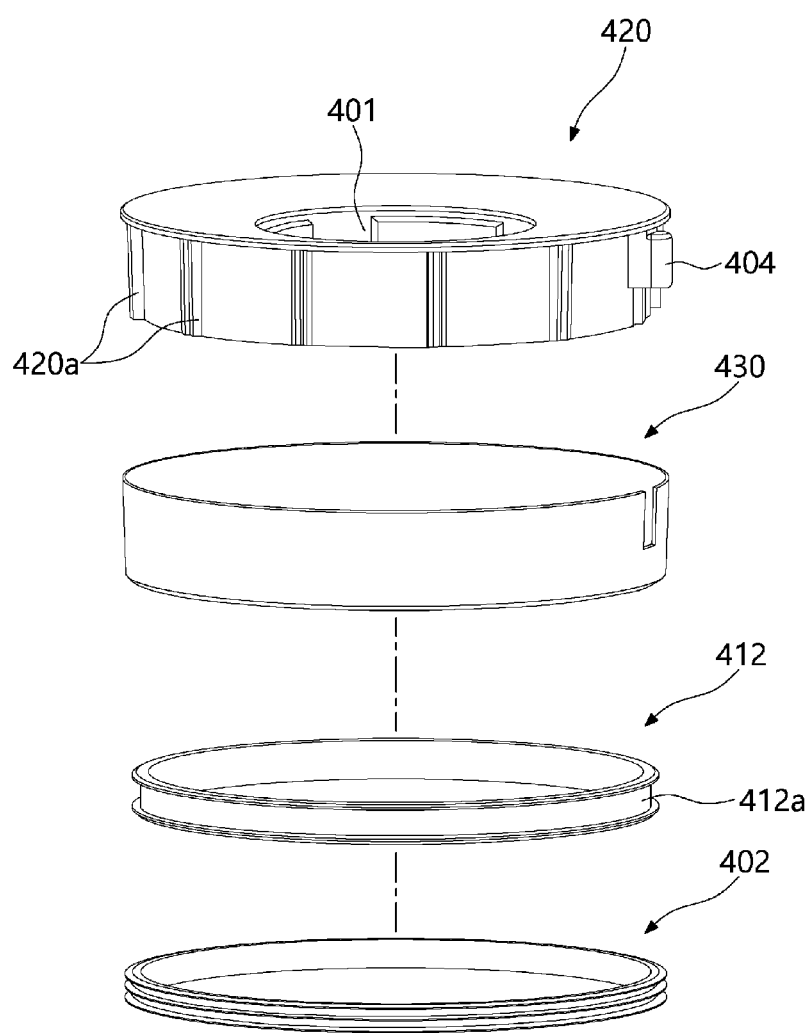
FIG. 13 is an exploded perspective view illustrating a configuration of a lid body constituting the container lid of FIG. 8.

FIGS. 8 to 13 illustrate a detailed configuration of a container lid 400. That is, FIGS. 8 and 9 are a perspective view and a cutaway perspective view of the container lid 400, respectively; FIGS. 10 and 11 are the top exploded perspective view and a bottom exploded perspective view of the container lid 400, respectively; FIG. 12 illustrates a cutaway exploded perspective view of the container lid 400; and FIG. 13 illustrates an exploded perspective view of a lid body 410 of the container lid 400.

As illustrated in these drawings, the container lid 400 may include: the lid body 410 having the lid hole 401 vertically formed therethrough; the cap 450 covering the lid hole 401; and a locking part 440 allowing the cap 450 to be removably mounted to the lid body 410.

Particularly, the lid body 410 may be configured to have the shape of a circular ring and to have the lid hole 401 vertically formed through the inner center thereof. In addition, the cap 450 may be removably mounted to such a lid hole 401, and open and close the lid hole 401.

The lid body 410 may include a lid casing 420 having the lid hole 401 vertically formed through the center thereof, and a lid exterior material 430 covering a side surface of the lid casing 420.

Multiple slit ribs 420*a* may be formed on the side surface of the lid casing 420 by protruding therefrom to the outside such that the lid exterior material 430 and the lid casing 420 are coupled to each other.

The slit ribs 420*a* may be configured in pairs, and a slit which is a gap having a predetermined size may be defined between each of such pairs of slit ribs 420*a*. Adhesive or an elastic material such as silicone may be applied to or fill such a slit such that the lid exterior material 430 and the lid casing 420 are coupled to each other.

Of course, the slit ribs 420*a* may protrude from the side surface of the lid casing 420 to the outside, so that the lid exterior material 430 and the lid casing 420 may be coupled to each other by forcible fitting.

The lid casing 420 may constitute the approximate appearance and overall frame of the lid body 410. Such a lid casing 420 may have the lid hole 401 therein vertically formed therethrough and having a diameter of a predetermined size In addition, the lid exterior material 430 may be coupled to the outer surface of the lid casing 420 such that the appearance thereof looks high quality and beautiful to a consumer. That is, the lid casing 420 may be made of plastic by injection molding, and the lid exterior material 430 may be made of a material such as stainless steel.

Accordingly, the lid exterior material 430 may be made of a material such as stainless steel which has a smooth surface and is resistant to rust.

The lid exterior material 430 may be coupled to the outer circumferential surface (a side surface) of the lid casing 420 by adhesive or by forcible fitting. Accordingly, as illustrated in the drawings, the multiple slit ribs 420*a* may be formed at the same intervals on the outer circumferential surface (the side surface) of the lid casing 420 by protruding therefrom to the outside.

The lid casing 420 may include: an outer wall 422 configured to have a shape of a circular ring and to constitute the appearance thereof; an inner wall 424 configured to have a diameter smaller than a diameter of the outer wall 422 and to have the lid hole 401 formed therein; and an upper surface 426 connecting the upper ends of the outer wall 422 and the inner wall 424 to each other.

Particularly, the lid casing 420 may, as a whole, have the shape of a circular ring being hollow there inside and having a predetermined width. That is, the lid casing 420 may have the lid hole 401 vertically formed through the center of the inside thereof, and may have a structure of a circular ring having a U-shaped section.

The container lid 400 is intended to cover the upper surface of the container body 100, and the lid hole 401 may be formed in the center of the container lid 400 by being vertically formed therethrough, and the cap 450 may be removably mounted to the lid hole 401. That is, as illustrated in the drawing, a hole may be formed in the center of the container lid 400 by being vertically formed therethrough and may constitute the lid hole 401, and the cap 450 may cover such a lid hole 401.

The gasket 402 blocking the gap between the container lid 400 and the container body 100 and a support ring 412 fixing and supporting the gasket 402 may be provided on a side of the lid body 410.

Accordingly, the support ring 412 and the gasket 402 having circular ring shapes may be provided on the lower side of the lid body 410. The support ring 412 may be fixed to the lower end of the lid body 410 by adhesive, and the gasket 402 may be in close contact with and coupled to the outer surface of the support ring 412.

More particularly, the support ring 412 may be coupled to the lower side of the outer wall 422, and the gasket 402 may be in close contact with and coupled to the outer surface of the support ring 412.

A support groove 412a may be formed in the outer surface of the support ring 412 by being recessed inward therefrom, and the gasket 402 may be received in and coupled to such a support groove 412a.

The gasket 402 may function to block the gap between the container lid 400 and the container body 100, and to prevent the container lid 400 mounted to the container body 100 from being accidentally removed from the container body 100.

Accordingly, the gasket 402 may be made of an elastic material, and as illustrated in the drawing, multiple corrugations may be formed in the outer circumferential surface of the gasket 402.

The cap 450 may be composed of an upper plate 452 exposed from the upper side of the lid body 410, and a cap body 454, at least a portion of which is received in the lid hole 401.

As illustrated in the drawings, the cap body 454 may be configured to have a shape of a truncated cone or a cylinder having a hollow inner portion as a whole. That is, the cap body 454 may be configured to have the shape of a truncated cone gradually decreasing in diameter going upward or the shape of a cylinder having the same top and bottom diameters.

The upper plate 452 may cover the upper surface of the cap body 454 having a predetermined height, and as illustrated in the drawings, may be configured to have a diameter larger than a diameter of the upper end of the cap body 454.

A middle ring 456 may be formed on the cap body 454 by protruding therefrom to the outside, and may be in contact with the inner surface of the upper end of the lid hole 401.

Particularly, the middle ring 456 may be formed by protruding from the middle or upper end of the cap body 454 to the outside, and when the cap 450 is mounted to the lid body 410, the middle ring 456 may constitute the same plane as the upper surface 426 of the lid body 410. Accordingly, the upper surface of the middle ring 456 may be exposed to the upper side of the lid body 410.

A ventilation groove 456a may be formed in the outer circumferential surface of the middle ring 456 by being recessed inward therefrom such that air flows to the upper and lower sides of the middle ring 456 through the ventilation groove. That is, the ventilation groove 456a may function to allow air to flow to the upper and lower sides of the middle ring 456 of the cap 450 through the ventilation groove. As illustrated in FIG. 10, the ventilation groove 456a may be formed by being recessed inward from the outer circumferential surface the middle ring 456.

A seating groove 424a may be formed in the upper end of the inner wall 424 such that the edge of the middle ring 456 sits therein. That is, as illustrated in FIG. 12, the seating groove 424a may be formed in the upper end of the inner surface of the inner wall 424 by being recessed outward therefrom to be stepped.

The inner circumferential surface of the seating groove 424a may be configured to have size corresponding to or larger than the size of the outer circumferential surface of the middle ring 456, and the inner diameter of the upper end of the inner wall 424 may have size smaller than the size of the outer diameter of the middle ring 456. Accordingly, the middle ring 456 may sit in the seating groove 424a, and may be supported thereby such that the middle ring 456 does not move downward toward the lower side of the inner wall 424.

As illustrated in FIG. 12, the outer wall 422 may be configured to have a vertical size corresponding to the vertical size of the inner wall 424, or to have a vertical size larger or smaller than the vertical size of the inner wall 424.

The locking part 440 may include a locking protrusion 442 formed by protruding from the lid body 410 to a side thereof, and a locking passage 444 formed in the cap 450 and receiving the locking protrusion 442. That is, the locking part 440 may include the locking protrusion 442 protruding inward from the inner circumferential surface of the lid body 410, and the locking passage 444 formed by being recessed inward from the outer circumferential surface of the cap 450 such that the locking protrusion 442 moves or is received therein.

Hereinafter, the structures and positions of the locking protrusion 442 and the locking passage 444 will be described further in detail.

The locking protrusion 442 may be formed by protruding inward from the inner surface of the inner wall 424. That is, the locking protrusion 442 may be formed at a position spaced apart by a predetermined distance upward from the lower end of the inner wall 424.

More particularly, a contact surface 424b may be formed on the inner surface of the inner wall 424 by protruding inward therefrom, the contact surface being in close contact with the outer surface of the cap body 454. That is, a portion of the lower half part of the inner wall 424 may be configured by protruding inward, and constitute the contact surface 424b. Such a contact surface 424b may be configured to have multiple contact surfaces on the inner wall 424. However, in the embodiment of the present disclosure, two contact surfaces are illustrated to be formed symmetrically to each other on the front and rear or the left and right of the inner wall 424.

The locking protrusion 442 may be formed by protruding inward from the contact surface 424b. That is, as illustrated in FIG. 12, the locking protrusion 442 may be formed by protruding inward (toward the center of the container lid) from the contact surface 424b, and may be formed at the position spaced apart by the predetermined distance upward from the lower end of the contact surface 424b.

A distance by which the locking protrusion 442 is spaced apart upward from the lower end of the cap body 454 or the contact surface 424b may correspond to the vertical length of an entrance groove 444a of the cap 450 to be described below.

Of course, the locking protrusion 442 may be formed on other portions except for the contact surface 424b. The contact surface 424b may protrude inward from the inner wall 424, so in the case in which the locking protrusion 442 is formed on the inner surface of the inner wall 424 instead of the contact surface 424b, the protruding size of the locking protrusion 442 may be larger than in the case in which the locking protrusion 442 is formed on the contact surface 424b.

The locking protrusion 442 described above may formed to correspond to the locking passage 444 in number and position. Accordingly, the locking protrusion 442 may be formed to have at least one locking protrusion on the inner wall 424 or the contact surface 424b. However, in the embodiment of the present disclosure, two locking protrusions 442 are illustrated to be formed on the inner wall 424 or the contact surface 424b to face each other at positions thereof symmetrical to each other.

A return groove 424c may be formed at a side of the contact surface 424b by being recessed therefrom to the outside more than the contact surface 424b, the return groove being a path allowing the food located on the upper side of the contact surface 424b to fall downward. That is, the contact surfaces 424b may be configured to have two contact surfaces 424b formed by being divided at positions symmetrical to each other on the lower half part of the inner wall 424, and the return groove 424c may be formed between such two contact surfaces 424b.

The return groove 424c may have a shape recessed toward the outside more than the contact surface 424b, and the upper and lower parts thereof may be open. Accordingly, when the food in the container body 100 splatters onto the contact surface 424b with the cap 450 mounted to the lid body 410, the food may fall downward through the return groove 424c and be introduced into the container body 100.

A return guide 424d may be formed on an end of the contact surface 424b such that the height of the upper end of the return guide gradually decreases going toward a side thereof, the return guide guiding the movement of the food located on the upper side of the contact surface 424b toward the return groove 424c.

Particularly, the return guide 424d may be slantingly formed at the opposite ends of the contact surface 424b, or at a left or right end thereof to have the height of the upper end thereof gradually decreasing going toward the left or right. Accordingly, the food positioned on the upper side of the contact surface 424b may slide down along the return guide 424d toward the return groove 424c, and finally fall down into the container body 100 located under the return groove 424c therethrough.

The locking passage 444 may be formed in the outer circumferential surface of the cap 450; provide the moving path of the locking protrusion 442; and maintain the received state of the locking protrusion 442 therein, so that the cap 450 may be coupled to the lid body 410.

The locking passage 444 may be formed by being recessed inward from the outer circumferential surface of the cap 450, and may include the entrance groove 444a guiding the vertical movement of the locking protrusion 442, and a locking groove 444b formed by extending horizontally from the end of the entrance groove 444a and supplying space to receive the locking protrusion 442.

Particularly, a pair of locking passages 444 may be formed in the outer circumferential surface of the lower end portion of the cap body 454. The number of such a locking passage 444 may be the same as the number of the locking protrusion 442.

As illustrated in FIG. 11, the entrance groove 444a may be formed by extending upward from the lower end of the cap body 454. Such an entrance groove 444a may be formed to have a predetermined length upward from the inner surface of the lower end of the cap body 454. That is, the vertical length of the entrance groove 444a may correspond to a distance ranging from the lower end of the inner wall 424 to the locking protrusion 442.

The locking groove 444b may be formed by extending from the upper end of the entrance groove 444a to the left or right perpendicular thereto. That is, the entrance groove 444a may be formed vertically, but the locking groove 444b may be formed horizontally. Accordingly, the upper end of the entrance groove 444a may be connected to the left or right end of the locking groove 444b. Accordingly, the locking protrusion 442 may move while being received in the entrance groove 444a and the locking groove 444b.

A removal prevention protrusion 446 may be formed in the locking groove 444b by protruding therefrom to the outside, the removal prevention protrusion preventing the removal of the locking protrusion 442 received in the locking groove 444b. That is, as illustrated in FIG. 11, the removal prevention protrusion 446 having a predetermined size may be formed in the horizontally formed locking groove 444b by protruding therefrom to the outside.

The removal prevention protrusion 446 may be formed to vertically cross the locking groove 444b. The protruding size of such a removal prevention protrusion 446 may be formed to have size smaller than the depth of the locking groove 444b.

The removal prevention protrusion 446 may be formed at a position adjacent to the end of the locking groove 444b. FIG. 11 illustrates the removal prevention protrusion 446 formed at position adjacent to the right end of the locking groove 444b.

Furthermore, a reinforcement part 454a may be formed on the inner circumferential surface of the cap body 454 by protruding inward therefrom. That is, a side (the inner surface of the cap body 454) opposite to the position of the cap body 454 in which the locking passage 444 is formed may protrude inward. Accordingly, even when the locking passage 444 is formed in the outer circumferential surface of the cap body 454, it is located at a position at which the inner surface protruding inward is located, and the cap body 454 may maintain a predetermined thickness.

Figure 14:
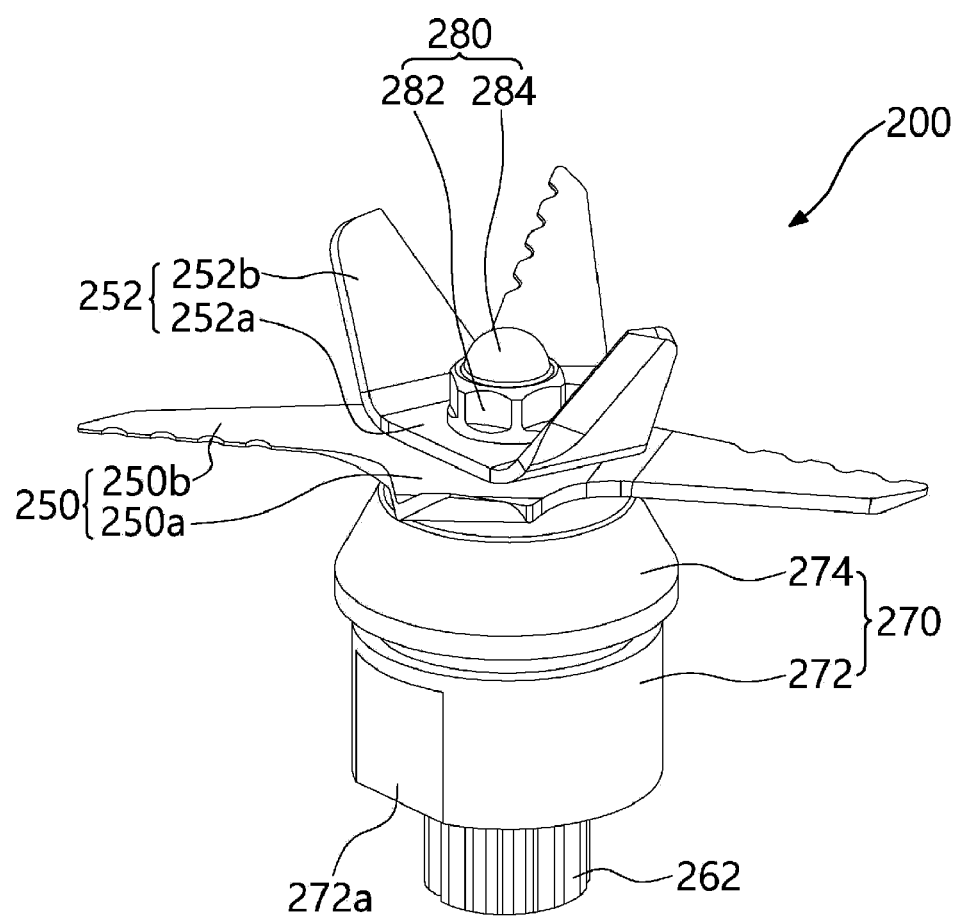
FIG. 14 is a perspective view illustrating a configuration of a blade assembly constituting a blender according to an embodiment of the present disclosure.
Figure 15:
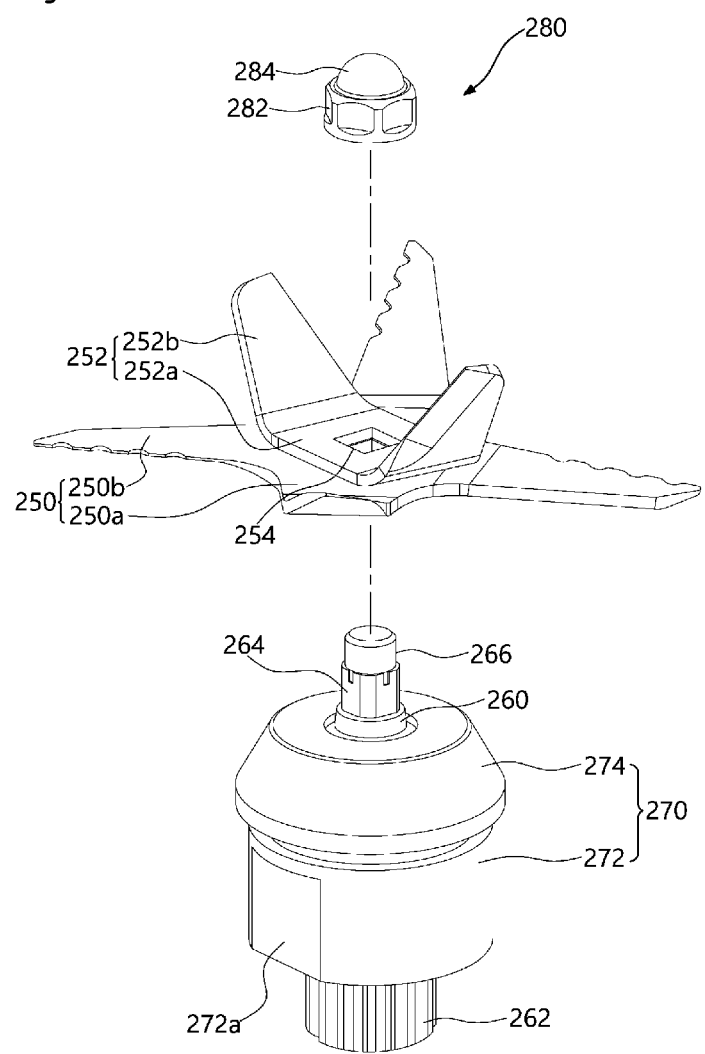
FIG. 15 is an exploded perspective view illustrating a detailed configuration of the blade assembly constituting the blender according to the embodiment of the present disclosure.

In FIGS. 14 and 15, a configuration of a blade assembly 200 is illustrated. That is, in FIG. 14, a perspective view of the blade assembly 200 is illustrated and in FIG. 15, an exploded perspective view of the blade assembly 200 is illustrated.

As illustrated in these drawings, the blade assembly 200 may include a main blade 250 having multiple main blade parts 250b formed therein, an auxiliary blade 252 having an auxiliary blade part 252b located between the multiple main blade parts 250b, a blade shaft 260 which is the center of the rotation of the main blade 250 and the auxiliary blade 252, a body 270 mounted to the lower end of the container body 100 and supporting the blade shaft 260 such that the blade shaft 260 can rotate, and a fastening cap 280 fastened to the blade shaft 260 and fastening the main blade 250 and the auxiliary blade 252 to the blade shaft 260.

The blade assembly 200 may finely crush or mix food by using the blades 250 and 252, and these blades 250 and 252 for crushing the food may be composed of the main blade 250 and the auxiliary blade 252.

The main blade 250 may perform the major function of crushing food, and the auxiliary blade 252 may function to assist the main blade 250 such that the food is more finely and easily crushed.

The main blade 250 may be composed of a main holding part 250a coupled to the blade shaft 260, and the multiple main blade parts 250b formed by protruding outward from the main holding part 250a.

As illustrated in the drawing, the main holding part 250a may be a part which is formed at the center portion of the main blade and is coupled to the blade shaft 260, and may support the multiple main blade parts 250b formed to be integrated with the outer sides of the main holding part 250a.

The main blade parts 250b may include four main blade parts formed by protruding radially from the main holding part 250a. The four main blade parts may be configured symmetrically to each other to form the same angles from the center of the main holding part 250a.

Specifically, as illustrated in the drawing, the main holding part 250a having a plate shape and a predetermined size may be formed at the center portion of the main blade 250, and four main blade parts 250b may be formed to be integrated with the outer side of such a main holding part 250a.

The main blade parts 250b are preferably configured as even-numbered main blade parts and are preferably configured symmetrically to each other in front-to-rear and side-to-side directions relative to the blade shaft 260.

Of course, in the blender of the present disclosure, the main blade parts 250b are illustrated to include four main blade parts, but may include three or five main blade parts. That is, the main blade parts 250b may be configured as odd-numbered main blade parts.

The main blade parts 250b may be configured to be horizontal to the main holding part 250a or to have predetermined angles from the main holding part 250a.

Specifically, the main blade parts 250b may be formed by extending horizontally outward from ends of the main holding part 250a or may be formed by extending upward or downward after bending by predetermined angles upward or downward from the ends of the main holding part 250a.

In the blender of the present disclosure, as illustrated in FIGS. 14 and 15, in the four main blade parts 250b, the main blade parts 250b which are formed in a side-to-side direction are configured to be horizontal to the main holding part 250a, and the main blade parts 250b which are formed in the front-to-rear direction are bent by predetermined angles upward from the front and rear ends of the main holding part 250a, respectively.

Figure 17:
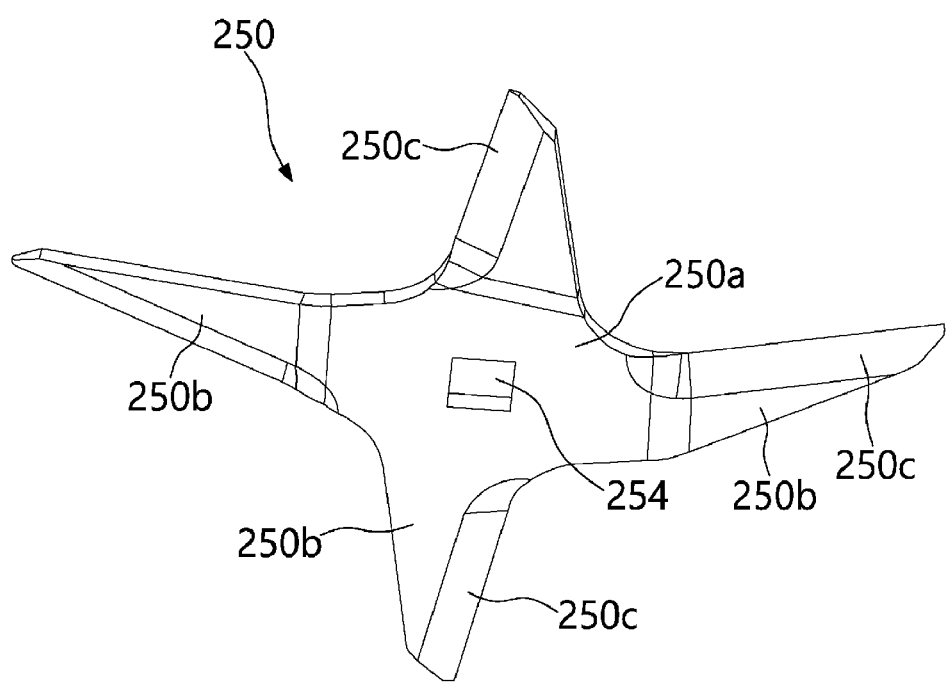
FIG. 17 is a lower perspective view illustrating a configuration of the main blade constituting the blender according to the embodiment of the present disclosure.

In addition, in addition to this configuration, the main blade parts 250b may bend to have predetermined angles downward to the main holding part 250a (see FIG. 17).

Additionally, in FIGS. 14 and 15, the main blade parts 250b are configured to have shapes symmetrical to each other in the front-to-rear and side-to-side directions relative to the center of the main holding part 250a, but may be configured to have shapes which are not symmetrical to each other.

For example, the main blade parts 250b formed in the side-to-side direction of the main holding part 250a may be horizontal or bend upward/downward, and may be configured to bend in directions different from each other. That is, in a pair of main blade parts 250b formed in the side-to-side direction of the main holding part 250a, the main blade part 250b of the left side may bend downward, and the main blade part 250b of the right side may bend upward (see FIG. 17).

The auxiliary blade 252 may be composed of an auxiliary holding part 252a coupled to the blade shaft 260, and multiple auxiliary blade parts 252b formed by protruding outward from the auxiliary holding part 252a.

As illustrated in the drawing, the auxiliary holding part 252a may be a part which is formed at the center portion of the auxiliary blade 252 and is coupled to the blade shaft 260, and may support at least one auxiliary blade part 252b formed to be integrated with the outer side of the auxiliary holding part 252a.

It is preferable that the number of the auxiliary blade parts 252b is fewer than the number of the main blade parts 250b, and it is preferable that the length of the auxiliary blade part 252b is shorter than the length of the main blade parts 250b.

Of course, the auxiliary blade part 252b and the main blade part 250b may be the same in number and size, but in the blender of the present disclosure, the auxiliary blade part 252b is configured to be smaller in number and size than the main blade part 250b, and is illustrated to assist the crushing of food performed by the main blade part 250b.

The auxiliary blade part 252b is preferably configured as even-numbered auxiliary blade parts. That is, as illustrated in the drawing, it is preferable that the auxiliary blade part 252b includes two auxiliary blade parts 252b bent upward from the opposite ends of the auxiliary holding part 252a, and in some cases, the auxiliary blade part 252b may include four auxiliary blade parts like the main blade parts 250b.

In the blender of the present disclosure, as illustrated in the drawing, the auxiliary blade part 252b is illustrated to include two auxiliary blade parts formed by protruding outward from the auxiliary holding part 252a such that the two auxiliary blade parts are symmetrical to each other.

The auxiliary blade part 252b may be configured to have a predetermined angle to the auxiliary holding part 252a by bending upward from the end of the auxiliary holding part 252a.

In addition, an angle formed between the auxiliary blade part 252b and the auxiliary holding part 252a is preferably smaller than an angle formed between the main blade part 250b and the main holding part 250a.

Specifically, the auxiliary blade part 252b may bend upward more than the main blade parts 250b. That is, an angle formed between the auxiliary blade part 252b and the upper surface of the auxiliary holding part 252a is preferably smaller than an angle formed between the main blade part 250b and the main holding part 250a.

This is intended so that the auxiliary blade 252 assists the crushing of food performed by the main blade 250 and at the same time, controls the movement of food at the internal center portion of the container body 100. That is, the auxiliary blade part 252b of the auxiliary blade 252 may be located at the center portion of the container body 100, and may rotate and mix food at the internal center portion of the container body 100.

Specifically, the auxiliary blade part 252b may partially cut food placed in the center portion of the container body except for space in which the main blade parts 250b operate and at the same time, may push outward or rotate the food at the center portion such that the food is moved toward the main blade parts 250b or upward.

Accordingly, the main blade 250 may perform the major function of moving and crushing the food contained in the container body 100, and the auxiliary blade 252 may also crush and move the food at the center portion of the container body 100 by assisting in the function of the main blade 250.

Meanwhile, the auxiliary blade part 252b may be installed to be located between the multiple main blade parts 250b. That is, the multiple main blade parts 250b may be installed such that the multiple main blade parts 250b are disposed at the same intervals of 90° relative to the center of the main holding part 250a, and the auxiliary blade part 252b may be located between the main blade parts 250b.

In this case, when the main blade parts 250b do not reach the food, the auxiliary blade part 252b may reach the food, so the processing efficiency of the food may be increased.

A fitting hole 254 receiving a fitting part 264, which will be described below, may be formed vertically through the centers of the main blade 250 and the auxiliary blade 252. That is, the fitting hole 254 may be formed vertically through the center of the main holding part 250a of the main blade 250 and the center of the auxiliary holding part 252a of the auxiliary blade 252, respectively.

The fitting hole 254 may be formed to have a shape corresponding to the outer surface of the fitting part 264 to be described below, and may be configured such that the main blade 250 and the auxiliary blade 252 rotate according to the rotation of the blade shaft 260.

Accordingly, as illustrated in the drawing, the fitting hole 254 is preferably configured to have a square shape.

The body 270 may be composed of a seating part 272 fixedly mounted to the bottom surface of the container body 100, and a protruding part 274 formed on the seating part 272 and exposed to the upper side of the bottom surface of the container body 100.

As illustrated in the drawing, the seating part 272 may be configured such that an overall shape thereof has a cylindrical shape, and may be mounted to the bottom surface of the container body 100. Accordingly, a fitting surface 272a is preferably formed on at least one surface of such a seating part 272, the fitting surface 272a being inserted into the bottom surface of the container body 100 from an upper side thereof such that the body 270 is held therein so as not to be rotated. That is, the fitting surface 272a may be formed on the seating part 272 such that the body 270 is inserted into the bottom surface of the container body 100 to be held therein.

Specifically, in a state in which the body 270 is mounted to the container body 100, the body 270 may be required to be held without being rotated even during the rotation of the blade shaft 260, so the fitting surface 272a may be configured such that the body 270 is fixedly inserted into the bottom surface of the container body 100.

The fitting surface 272a may be formed on the outer surface of the seating part 272 by being recessed inward therefrom such that the fitting surface 272a has a flat surface. Such a fitting surface 272a may be located on the corresponding surface (not shown) of the container body 100 so as to prevent the rotation of the body 270.

As illustrated in the drawing, the fitting surface 272a may be configured as a shape of a flat groove having a lower open part, and preferably includes a pair of fitting surfaces disposed symmetrically to each other on opposite sides of the seating part 272. Accordingly, the fitting surface 272a may maintain the state of being inserted into the bottom surface of the container body 100 from the upper side to be held therein.

As illustrated in the drawing, the protruding part 274 may be formed on the seating part 272. Additionally, the lower end of such a protruding part 274 may be configured to have an outer diameter larger than the outer diameter of the seating part 272.

Accordingly, when the body 270 is mounted to the bottom surface of the container body 100, the outer diameter of the lower end of the protruding part 274 may be larger than the inner diameter of a body insertion hole (not shown) formed through the bottom surface of the container body 100, so the protruding part 274 may be exposed to the upper side of the bottom surface of the container body 100.

As illustrated in the drawing, the protruding part 274 preferably has a tapered shape having an outer diameter decreasing gradually going upward.

The blade shaft 260 may be configured to vertically have a predetermined length and may be installed to pass through the center of the inside of the body 270.

In addition, the blade shaft 260 may be installed to be rotatable inside the body 270. Accordingly, although not shown, a bearing is preferably installed inside the body 270, the bearing enabling the blade shaft 260 to be rotated while the blade shaft 260 is inserted into the body 270.

A connecting part 262 may be provided on the lower end of the blade shaft 260, the connecting part 262 configured to operate in cooperation with the motor assembly 600 so as to transmit the power of the motor assembly 600.

As illustrated in the drawing, the connecting part 262 is preferably configured as a spline shaft having an outer circumferential surface having the cross section of a corrugated shape. Accordingly, although not shown, a spline boss is preferably provided on the connecting part of the upper end of the motor assembly 600 to which the connecting part 262 is coupled, the spline boss corresponding to the connecting part of the upper end of the motor assembly 600.

The fitting part 264 to which the main blade 250 and the auxiliary blade 252 are mounted, and a fitting end 266 to which the fastening cap 280 is coupled may be provided on the upper end of the blade shaft 260.

Specifically, the fitting end 266 to which the fastening cap 280 is coupled may be formed on the upper end of the blade shaft 260, and the fitting part 264 may be provided on the lower side of such a fitting end 266.

As illustrated in the drawing, the fitting part 264 is preferably configured to have an outer diameter smaller than the outer diameter of the blade shaft 260 received in the body 270.

Accordingly, while the main blade 250 and the auxiliary blade 252 are mounted to the fitting part 264, the main blade 250 and the auxiliary blade 252 may not move further downward. Accordingly, the main blade 250 and the auxiliary blade may rotate in a state in which the lower surfaces of the main blade 250 and the auxiliary blade 252 do not interfere with the upper surface of the body 270.

While the main blade 250 and the auxiliary blade 252 are mounted to the fitting part 264, the main blade 250 and the auxiliary blade 252 may rotate together with the blade shaft 260.

Accordingly, the outer surface of the fitting part 264 preferably has a shape corresponding to the inner surface of the fitting hole 254. That is, the fitting hole 254 formed in the main blade 250 and the auxiliary blade 252 may have a square shape, and thus when the outer surface of the fitting part 264 has size and shape corresponding to the fitting hole 254, the main blade 250 and the auxiliary blade 252 may rotate together with the blade shaft 260 without a separate fixing device in the state in which the main blade 250 and the auxiliary blade 252 are mounted to the fitting part 264.

Accordingly, the cross section of the fitting part 264 preferably has a square shape corresponding to the fitting hole 254. Furthermore, the size of the outer surface of the fitting part 264 may be smaller than the size of the inner surface of the fitting hole 254 such that the fitting part 264 is received in the fitting hole 254, and the length of the diagonal line of the cross section of the fitting part 264 may be required to be larger than distance between surfaces facing each other in the fitting hole 254 such that the main blade 250 and the auxiliary blade 252 do not rotate in the fitting hole 254 while being mounted to the fitting part 264.

The fastening cap 280 may be coupled to the upper end of the blade shaft 260, and may prevent the main blade 250 and the auxiliary blade 252 from being removed upward to be held thereto while the main blade 250 and the auxiliary blade 252 are mounted to the blade shaft 260.

The fastening cap 280 may be composed of a nut part 282 coupled to the fitting end 266, and a cap part 284 formed on the upper surface of the nut part 282 by protruding to have a dome shape upward therefrom.

It is preferable that a tap is formed inside the nut part 282 and threads are formed on the fitting end 266 such that the fastening cap 280 is screwed to the fitting end 266.

The cap part 284 may be configured to have a dome shape which is a hemispherical roof shape, and may be formed integrally with the nut part 282. Such a cap part 284 may function to prevent the food or foreign matter from being introduced into the inner hole of the cap part 284 formed in the center of the nut part 282, and may induce the food to slide from the upper surface of the cap part 284 without being in contact with and sticking to the upper surface thereof.

Figure 16:
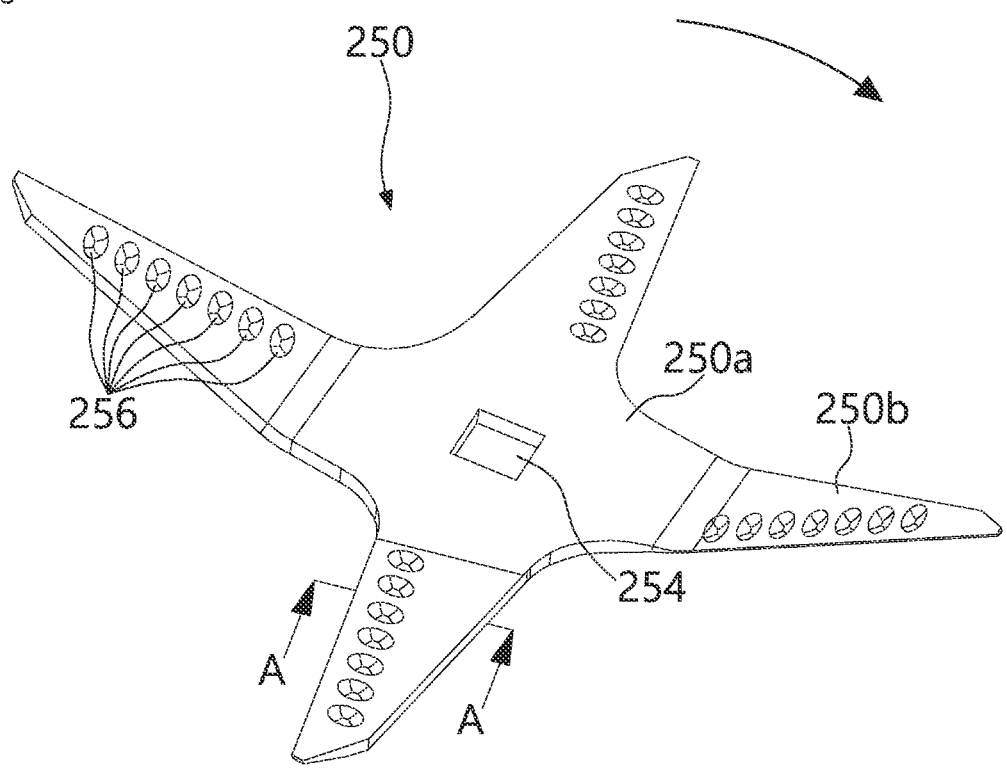
FIG. 16 is an upper perspective view illustrating a configuration of a main blade constituting a blender according to an embodiment of the present disclosure.
Figure 18:
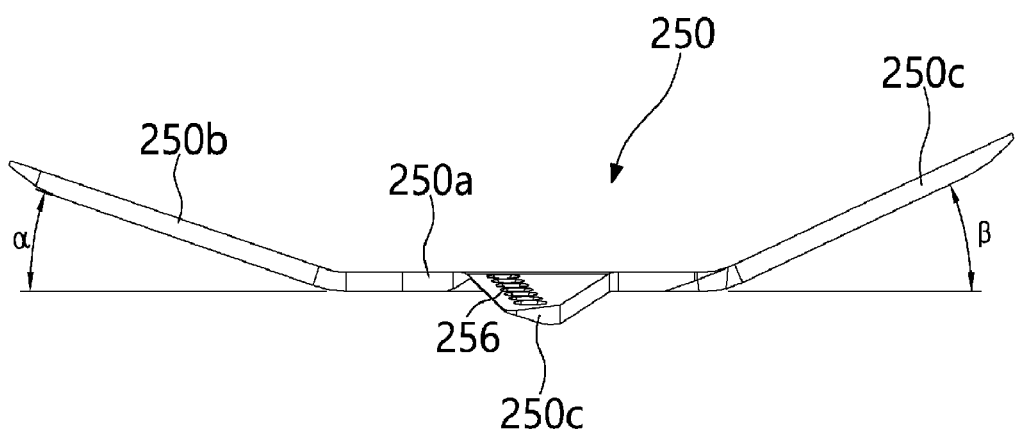
FIG. 18 is a front view illustrating a configuration of the main blade constituting the blender according to the embodiment of the present disclosure.
Figure 19:
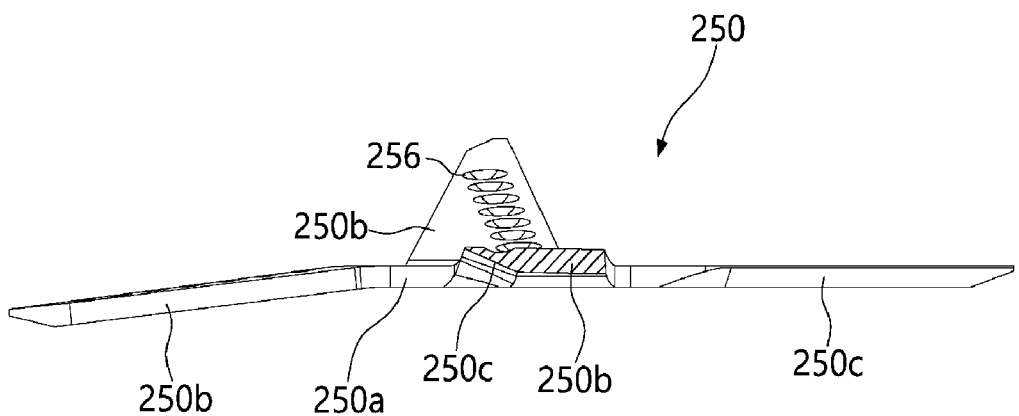
FIG. 19 is a partially cut right side view illustrating a configuration of the main blade constituting the blender according to the embodiment of the present disclosure.
Figure 20:
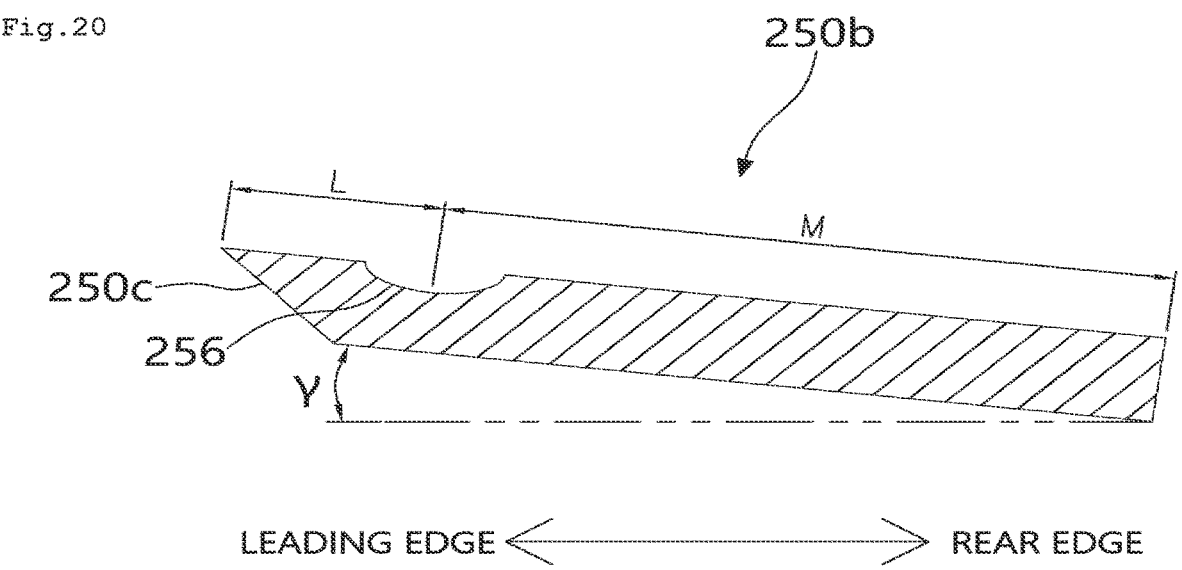
FIG. 20 is a sectional view taken along line A-A of FIG. 16.
Figure 21:
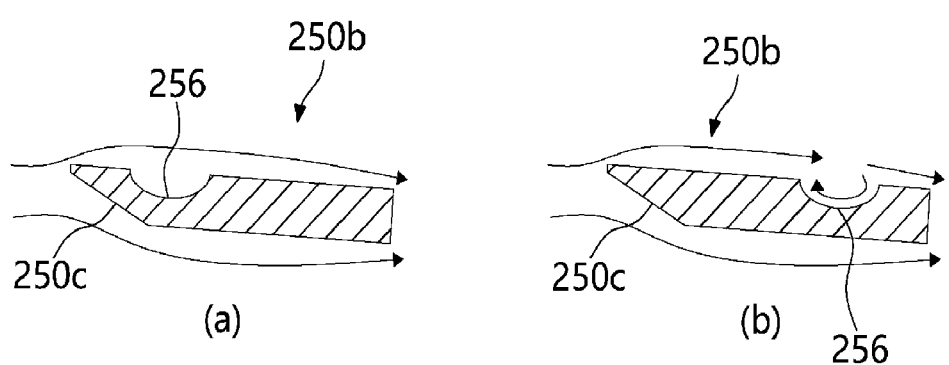
FIGS. 21(a) and 21(b) are partial sectional views illustrating states of a flow of fluid according to positions of a dimple formed in the main blade constituting the blender according to the embodiment of the present disclosure.

In FIGS. 16 to 20, an embodiment of the blade constituting the blade assembly 200 is illustrated. That is, the upper and lower perspective views of the configuration of the blade 250 constituting the blade assembly 200 according to the embodiment are illustrated in FIGS. 16 and 17, respectively; the front view and partially cut right side view of the blade 250 are illustrated in FIGS. 18 and 19, respectively; and a sectional view taken along line A-A of FIG. 16 is illustrated in FIG. 20. Additionally, partial sectional views showing the states of the flow of fluid according to the positions of the dimple formed in the main blade 250 constituting the blades 250 and 252 are illustrated in FIGS. 21(a) and 21(b), respectively.

In these drawings, in the blades 250 and 252, the embodiment of the main blade 250 is illustrated. Accordingly, hereinafter, the configuration of the main blade 250 will be described as an example, and the auxiliary blade 252 may have the same configuration as the main blade 250.

Hereinafter, among the components of the main blade 250 described above, the same reference numerals are used for components having the same functions, and for convenience, overlapping detailed configuration and function description will be omitted.

As described above, the main blade 250 may be composed of the main holding part 250a coupled to the blade shaft 260, and the multiple main blade parts 250b formed by protruding outward from the main holding part 250a.

The main blade parts 250b may include four main blade parts formed by protruding radially from the main holding part 250a. The four main blade parts may be formed symmetrically to each other to be disposed at the same intervals relative to the center of the main holding part 250a. That is, the four main blade parts 250b may be formed to be integrated with the outer sides of the main holding part 250a.

In the blender of the present disclosure, the main blade parts 250b are illustrated to include four main blade parts. The main blade parts 250b may be configured to constitute the same plane as the main holding part 250a or to have predetermined angles thereto.

Specifically, as illustrated in the drawing, among the four main blade parts 250b, the main blade parts 250b formed in a side-to-side direction may bend upward to have predetermined angles $\alpha$ and $\beta$, respectively, to the main holding part 250a, and the main blade parts 250b formed in a front-to-rear direction may bend by predetermined angles downward from the front and rear ends of the main holding part 250a.

In addition to such a configuration, among the main blade parts 250b, at least one main blade part may be formed on the same plane as the main holding part 250a by extending laterally therefrom such that the at least one main blade part is horizontal to the main holding part 250a.

Furthermore, the main blade parts 250b may be configured to have shapes symmetrical to each other in the front-to-rear and side-to-side directions relative to the center of the main holding part 250a, but may be configured to have shapes which are not symmetrical to each other.

For example, the main blade parts 250b formed in the side-to-side direction of the main holding part 250a may be configured to be horizontal or may bend upward/downward, and may be configured to bend in directions different from each other. That is, in a pair of main blade parts 250b formed in the side-to-side direction of the main holding part 250a, the main blade part 250b of the left side may bend downward, and the main blade part 250b of the right side may bend upward.

Meanwhile, even when the pair of main blade parts 250b formed in the side-to-side direction of the main holding part 250a bends upward or downward, the main blade parts 250b may be configured to have bending angles different from each other. That is, referring to FIG. 18, an angle $\alpha$ formed between the main blade part 250b formed at the left side of the main holding part 250a and the main holding part 250a may be different from an angle $\beta$ formed between the main blade part 250c formed at the right side of the main holding part 250a and the main holding part 250a.

In addition, the four main blade parts 250b formed in the side-to-side direction of the main holding part 250a may be configured to be horizontal, or may be configured to bend at angles different from each other or in directions different from each other.

In the embodiment, among the four main blade parts 250b, the two main blade parts 250b of the side-to-side direction are bent upward from the main holding part 250a, and the two main blade parts 250b of the front-to-rear direction are bent downward from the main holding part 250a.

Accordingly, when the main blade parts 250b are configured to have various bending angles, a part in which the food is crushed or cut by the main blade parts 250b may be increased, so the crushing efficiency of the food may be improved.

Meanwhile, the blade 250 or 252 is preferably configured to have at least one end thinner than a center portion thereof. That is, an end part of the main blade 250 or the auxiliary blade 252 may be configured to have a thickness decreasing gradually going toward an end thereof.

As illustrated in the drawing, the leading edge of the main blade 250 is preferably configured to have thickness decreasing gradually going toward an end (a front) thereof.

Hereinafter, for convenience of explanation, the leading edge of the main blade 250 means an edge serving as a blade surface, and the rear edge of the main blade 250 is defined as meaning an opposite side to the blade surface. That is, in FIG. 16, when the main blade 250 rotates clockwise (when seen from an upper side) as marked by an arrow, a blade surface which cuts the food is the leading edge, and an opposite side to the blade surface which is not used to cut food is referred to as a rear edge. In this case, in FIG. 20, the left end is the leading edge of the main blade 250, and the right end is the rear edge of the main blade 250.

Accordingly, in the embodiment, at least one surface of each of the blades 250 and 252 may have an inclined surface 250c having thickness decreasing gradually going toward an end thereof. That is, the inclined surface 250c may be formed on at least one of the leading or rear edge of each of the main blade parts 250b of the main blade 250.

More specifically, the inclined surface 250c may be formed on the upper or lower surface of the main blade part 250b of the blade 250, the inclined surface having thickness decreasing gradually going toward the leading or rear edge. That is, the inclined surface 250c may be formed on the edge portion of the upper or lower surface of the main blade part 250b of the main blade 250 such that the inclined surface has thickness decreasing gradually going toward the edge portion.

In the drawing illustrating the embodiment, the inclined surface 250c is illustrated to be formed only on the leading edge of the main blade 250. That is, the inclined surface 250c may be formed on the leading edge at the lower surface of the main blade part 250b of the main blade 250 such that the inclined surface 250c has height increasing gradually going toward the leading edge.

Such an inclined surface 250c may facilitate the crushing of the food and may function to force the downward movement of the fluid and food. That is, when the leading edge of the main blade part 250b of the main blade 250 has the inclined surface 250c to be sharp, the blade surface of the main blade part 250b may be sharp and may easily cut the food. Furthermore, due to the inclined surface 250c inclined in a downward direction, the leading edge of the main blade part 250b may function to push the food or fluid downward during the rotation of the main blade part 250b.

Meanwhile, the main blade part 250b of the main blade 250 may be configured to be inclined such that the leading edge the main blade part 250b is located at a position higher than the rear edge thereof. That is, as illustrated in FIG. 20, the leading edge (the left end in FIG. 20) of the main blade part 250b of the main blade 250 may be configured to be higher by a predetermined angle γ than the rear edge thereof (the right end in FIG. 20).

Accordingly, when the leading edge of the main blade part 250b of the main blade 250 is configured to be higher by a predetermined angle γ than the rear edge thereof, the food may be pushed downward by the main blade part 250b, so the food may be moved while being crushed, and thus may be efficiently mixed.

In addition, a groove such as a dimple may be formed in the upper or lower surface of the blade 250 or 252. That is, the dimple 256 may be formed in the upper or lower surface of the main blade part 250b of the main blade 250.

In the embodiment, at least one dimple 256 is illustrated to be formed in the upper surface of the main blade part 250b of the main blade 250.

The dimple 256 is preferably formed in the leading edge part of the blade 250. That is, the dimple 256 may be formed in the leading edge part of the main blade part 250b of the main blade 250.

More specifically, a distance L between the leading edge of the blade 250 and the dimple 256 may be shorter than a distance M between the rear edge of the blade 250 and the dimple 256. That is, the dimple 256 may be configured such that the distance L between the leading edge (the left end in FIG. 20) of the main blade part 250b of the main blade 250 and the dimple 256 is shorter than the distance M between the rear edge (the right end in FIG. 20) of the main blade part 250b of the main blade 250 and the dimple 256.

Accordingly, the reason in which the dimple 256 is formed in the leading edge of the main blade part 250b of the main blade 250 instead of the rear edge thereof is to prevent a vortex from being formed by the dimple 256. That is, when the dimple 256 is formed at a position near the rear edge of the main blade part 250b of the main blade 250, a vortex may be generated by the dimple 256, which may generate noise and may increase the contact resistance of the main blade.

More specifically, as illustrated in FIG. 21(a), when the dimple 256 is formed in the leading edge of the main blade part 250b of the main blade 250, a vortex may not be generated by the dimple 256 while the fluid introduced to the leading edge flows to the upper and lower sides of the main blade part 250b.

However, as illustrated in FIG. 21(b), when the dimple 256 is formed at a position near the rear edge of the main blade part 250b of the main blade 250, a vortex may be generated by the dimple 256 while the fluid introduced to the leading edge flows to the upper and lower sides of the main blade parts 250b. That is, when the dimple 256 is formed in the upper surface of the main blade part 250b, the fluid flowing along the upper surface of the main blade part 250b may generate a vortex.

Accordingly, when the dimple 256 is formed at a position near the leading edge of the blade 250 or 252, a vortex may not be generated, but when the dimple 256 is formed at a position far from the leading edge of the blade 250 or 252, a vortex may be generated, so the dimple 256 may be required to be formed at a position near the leading edge of the main blade part 250b of the main blade 250.

Meanwhile, as far as the dimple 256 is formed by being recessed by a predetermined depth to the inside (a lower or upper side) of the main blade part 250b of the main blade 250 from the upper or lower surface, respectively, thereof, the dimple 256 may have various shapes.

For example, in the embodiment of the present disclosure, as illustrated in the drawings, the dimple 256 may be configured as a circular recess, and alternatively, the dimple 256 may be configured as an oval recess or a groove having a slit shape.

In addition, the dimple 256 may be configured as a rectangular groove, various polygonal grooves, or grooves having various shapes in which straight or curved lines are mixed.

The dimple 256 may include multiple dimples formed in the blade 250 or 252, and the multiple dimples 256 are preferably configured to be parallel to the leading edge of the blade 250 or 252. That is, the multiple dimples 256 may be configured to be parallel to the leading edge of the main blade part 250b of the main blade 250 such that distances between the multiple dimples 256 and the leading edge of the main blade part 250b are the same.

This is to facilitate the flow of the fluid passing by the blade 250, that is, the main blade part 250b of the main blade 250 and to prevent the generation of noise by making the flow path of the fluid uniform overall.

Accordingly, in the embodiment, the inclined surface 250c may be formed on the leading edge at the lower surface of the main blade part 250b, and the dimple 256 may be formed in the upper surface of the main blade part 250b. That is, the inclined surface 250c may be formed on the leading edge part at the lower surface of the main blade part 250b such that the lower surface has height increasing gradually going toward the leading edge, and the dimple 256 is preferably formed at a position near the leading edge at the upper surface of the main blade part 250b.

In addition, such a dimple 256 may be formed even in the auxiliary blade part 252b of the auxiliary blade 252 in addition to the main blade part 250b of the main blade 250. That is, the dimple 256 may be formed in any one of the main blade 250 and the auxiliary blade 252, and may be formed in each of the main blade 250 and the auxiliary blade 252.

Hereinafter, an operation of the blender of the present disclosure having the above-described configuration will be described with reference to the accompanying drawings.

When the container body 100 sits on the main body 500, the state of FIG. 1 may be realized, and in this state, the operation of the blender of the present disclosure may start.

First, power supply from the outside may be required such that a user operates the blender, and a wireless power supply device having the wireless power module 520 may be used for such power supply. That is, the power supply from the outside may be performed by the induced electromotive force. Of course, the power supply may be performed by wire.

The power of the wireless power module 520 may be supplied to parts, in which power is required, such as the motor assembly 600, the manipulation part 504, and the power transmission part 700, and a user may start or stop the operation of the blender by manipulating the manipulation part 504 or the knob 502.

For example, when the user starts crushing food by manipulating the manipulation part 504 or the knob 502, the motor assembly 600 is required to be operated to rotate the blades of the blade assembly 200.

However, in this case, the detection system may determine whether the container lid 400 is closed, and when the container lid 400 is opened, the motor assembly 600 and the blade assembly 200 may not be operated.

Particularly, since the reed switch 234 may be normally open (off), the power reception part 220, the reed switch 234, and the light transmission module 810 may not form a closed circuit in the container body 100, so that the light reception module 820 may not receive light.

Accordingly, when the light reception module 820 does not receive light, the power supply to the motor assembly 600 may be cut off by such a signal.

In this state, when the container lid 400 is closed, the permanent magnet 232 of the container lid 400 may be positioned to be adjacent to the reed switch 234, and the reed switch 234 may be turned on, whereby the power reception part 220, the reed switch 234, and the light transmission module 810 may form a closed circuit, so the light reception module 820 may receive light transmitted by the light transmission module 810.

In this case, due to the detection of the closing of the container lid 400, the motor assembly 600 may start operating by the manipulation of the user, and the food inside the container body 100 may be crushed. Of course, in this case, whether the container body 100 is mounted to the main body 500 may be detected by the container body detection switch 960 prior to the starting of the operation of the motor assembly 600.

In addition, in this case, the operation state of the blender of the present disclosure may be displayed to the outside by the display part 506, so the user may visually recognize the operation state or time of the blender.

Meanwhile, when the container lid 400 is mounted to or removed from the container body 100, the user may open or close the container lid 400 by grasping the upper half part of the cap 450. The container lid 400 may be in close contact with and mounted to the upper surface of the container body 100 by a force of pushing the container lid 400 downward by the user. In this case, the gap between the container lid 400 and the container body 100 may be covered by the gasket 402 provided on the outer surface of the container lid 400.

When the food inside the container body 100 is crushed or mixed by the operation of the motor assembly 600 and the blade assembly 200 and the work according to the intention of the user is completed, the user may raise and remove the container body 100 upward from the main body 500, open the container lid 400, and take out the food contained inside the container body 100.

In addition, the user may remove the cap 450 mounted to the center of the container lid 400 therefrom, and this removal of the cap may be performed by movement in which the user rotates and moves upward the upper end portion of the cap 450 by grasping the upper end portion thereof.

When the cap 450 is removed from the lid body 410, the user may insert the food into the container body 100 through the lid hole 401, and may stir the food contained inside the container body 100 by using a rod.

In addition, the blade of the blade assembly 200 may be composed of the main blade 250 and the auxiliary blade 252, so the crushing and mixing of the food may be further facilitated.

Meanwhile, as described above, in FIGS. 16 to 21(a) and 21(b), the detailed configuration of the blade 250 according to an embodiment is illustrated, and the food may be prevented from sticking to the surface of the blade 250 by the dimple 256 formed in any one surface of the blade 250, so the crushing efficiency of the food may be improved.

In addition, such a dimple 256 may include multiple dimples formed at a position near the leading edge of the blade 250 or 252, and thus the fluid may efficiently flow, so the formation of a vortex may be prevented and the movement of the food may be efficiently performed.

The scope of the present disclosure is not limited to the embodiments illustrated above, and within the technical scope as described above, many other modifications based on the present disclosure will be possible for those skilled in the art.

The invention claimed is:

1. A blender comprising:
   a container body to receive food;
   a main body to support the container body;
   a container lid to removably mount to an upper surface of the container body to open and close an upper part of the container body; and
   a blade assembly including a blade to crush the food contained in the container body,
   wherein a dimple and an inclined surface are formed on an upper surface and a lower surface of the blade, respectively.

2. The blender of claim 1, wherein the dimple is formed at a position near the leading edge of the upper surface of the blade, and the inclined surface is formed on the leading edge of the lower surface of the blade.

3. The blender of claim 1, wherein a distance between a leading edge of the blade and the dimple is shorter than a distance between a rear edge of the blade and the dimple.

4. The blender of claim 1, wherein the dimple is formed as a recess having a circular or oval shape, or as a groove having a slit shape.

5. The blender of claim 1, wherein the blade assembly including the blade comprises:
   a main blade having multiple main blade parts disposed therein,
   wherein the dimple comprises at least one dimple formed at a surface of a main blade part of the multiple main blade parts.

6. The blender of claim 5, wherein the main blade part is inclined such that a leading edge of the main blade part is located at a position higher than a rear edge thereof, and the dimple is formed closer to the leading edge than the rear edge of the main blade part.

7. The blender of claim 5, wherein a distance between a leading edge of the main blade part and the dimple is shorter than a distance between a rear edge of the main blade part and the dimple.

8. The blender of claim 7, wherein the dimple comprises multiple dimples formed parallel to the leading edge of the main blade part.

9. The blender of claim 7, wherein an inclined surface is formed at the leading edge at a lower surface of the main blade part, and the dimple is formed at an upper surface of the main blade part.

10. The blender of claim 5, wherein the main blade part is angled such that a front end of the main blade part is located at a position higher than a rear end of the main blade part.

11. The blender of claim 5, wherein the main blade part is angled such that a front end of the main blade part is located at a position lower than a rear end of the main blade part.

12. The blender of claim 5, wherein the main blade part is horizontal such that a front end of the main blade part is located at a same horizontal plane as a rear end of the main blade part.

13. The blender of claim 5, wherein the multiple main blade parts are angled different from each other.

14. The blender of claim 5, wherein a thickness of the main blade part decreases going toward a front end of the main blade.

15. The blender of claim 5, wherein the blade assembly including the blade comprises
   an auxiliary blade having an auxiliary blade part located between the multiple main blade parts,
   wherein the auxiliary blade part comprises at least one dimple formed at a surface of the auxiliary blade.

16. The blender of claim 15, wherein a distance between a leading edge of the auxiliary blade part and the dimple is shorter than a distance between a rear edge of the auxiliary blade part and the dimple.

17. The blender of claim 15, wherein a length of the auxiliary blade part is shorter than a length of the main blade part.

18. The blender of claim 15, wherein an inclined surface is formed at a leading edge at a lower surface of the auxiliary blade part, and the dimple is formed at an upper surface of the auxiliary blade part.

19. The blender of claim 15, wherein the auxiliary blade is angled upward more than the main blade part.

* * * * *